United States Patent
Yamaoka et al.

(10) Patent No.: US 9,288,300 B2
(45) Date of Patent: Mar. 15, 2016

(54) COMMUNICATION APPARATUS AND COMMUNICATION METHOD

(75) Inventors: Masaru Yamaoka, Osaka (JP); Michihiro Matsumoto, Kyoto (JP); Tomoaki Ohira, Osaka (JP); Toshiaki Ohnishi, Osaka (JP); Tsuyoshi Sakata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 636 days.

(21) Appl. No.: 13/581,387

(22) PCT Filed: Dec. 27, 2011

(86) PCT No.: PCT/JP2011/007316
§ 371 (c)(1),
(2), (4) Date: Aug. 27, 2012

(87) PCT Pub. No.: WO2012/090494
PCT Pub. Date: Jul. 5, 2012

(65) Prior Publication Data
US 2012/0322374 A1 Dec. 20, 2012

(30) Foreign Application Priority Data
Dec. 28, 2010 (JP) ................................. 2010-293166

(51) Int. Cl.
*H04B 7/00* (2006.01)
*H04B 5/00* (2006.01)
(Continued)

(52) U.S. Cl.
CPC ............. *H04M 1/7253* (2013.01); *H01Q 1/125* (2013.01); *H01Q 1/2216* (2013.01); *H01Q 1/243* (2013.01); *H01Q 7/00* (2013.01); *H04M 1/72519* (2013.01); *H04M 2250/04* (2013.01)

(58) Field of Classification Search
CPC ..... H01Q 1/125; H01Q 1/2216; H01Q 1/243; H01Q 7/00; H04M 1/72519; H04M 1/7253; H04M 2250/04
USPC ................................................ 455/41.1, 41.2
See application file for complete search history.

(56) References Cited

U.S. PATENT DOCUMENTS

2008/0093447 A1* 4/2008 Johnson et al. ................ 235/383
2010/0190537 A1* 7/2010 Fujii ........................... 455/575.4
(Continued)

FOREIGN PATENT DOCUMENTS

| JP | 2009-33590 | 2/2009 |
| JP | 2010-109594 | * 5/2010 |
| JP | 2010-211577 | 9/2010 |

OTHER PUBLICATIONS

International Search Report issued Feb. 7, 2012 in International (PCT) Application No. PCT/JP2011/007316.

*Primary Examiner* — Ping Hsieh
*Assistant Examiner* — Xin Jia
(74) *Attorney, Agent, or Firm* — Wenderoth, Lind & Ponack, L.L.P.

(57) ABSTRACT

The present invention provides a communication apparatus and a communication method that can easily indicate the position of the antenna incorporated in the communication apparatus to a user and can align the antenna of the communication apparatus with the antenna of an external device. A portable device (1) includes a loop antenna (11) for performing near-field communication, a display unit (12) provided on a side of the portable device (1) opposite the orientation of the loop antenna (11), and an antenna position information storing unit (142) that stores antenna position information representing the position of the loop antenna (11) in the portable device (1). The display device (12) displays the position of the loop antenna (11) on the basis of the antenna position information stored in the antenna position information storing unit (142).

7 Claims, 17 Drawing Sheets

(51) Int. Cl.
*H04M 1/725* (2006.01)
*H01Q 1/12* (2006.01)
*H01Q 1/22* (2006.01)
*H01Q 1/24* (2006.01)
*H01Q 7/00* (2006.01)

(56) References Cited

U.S. PATENT DOCUMENTS

2010/0194334 A1\* 8/2010 Kirby et al. .................... 320/108
2011/0007901 A1\* 1/2011 Ikeda et al. .................... 380/270

\* cited by examiner

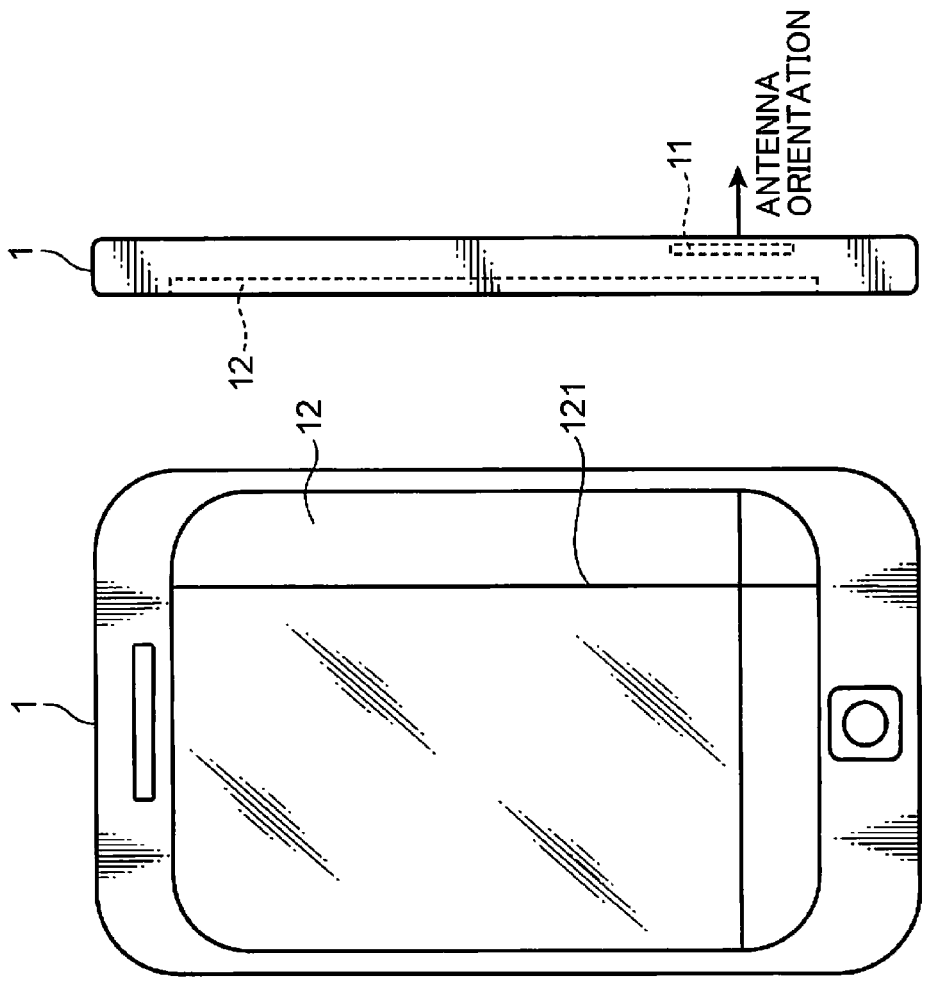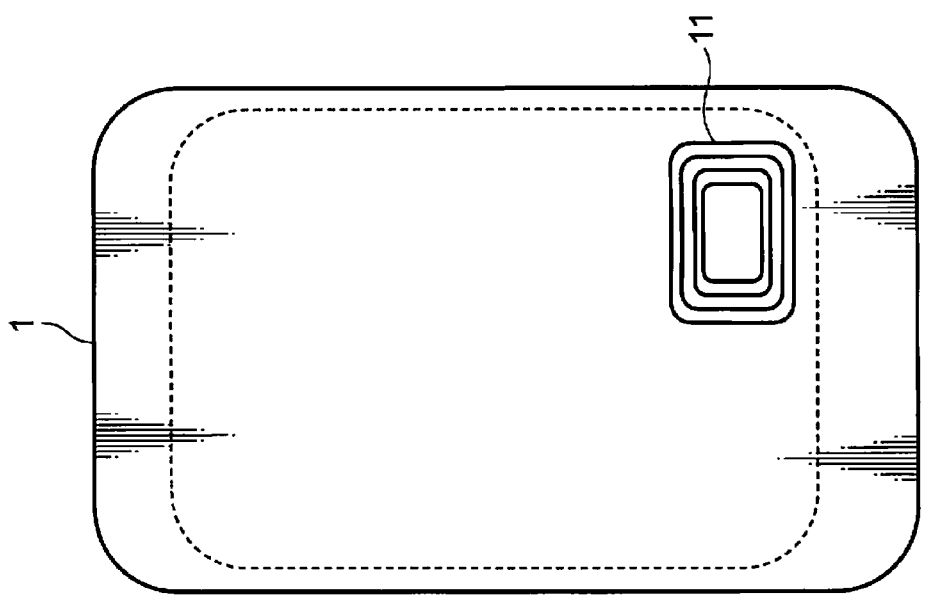

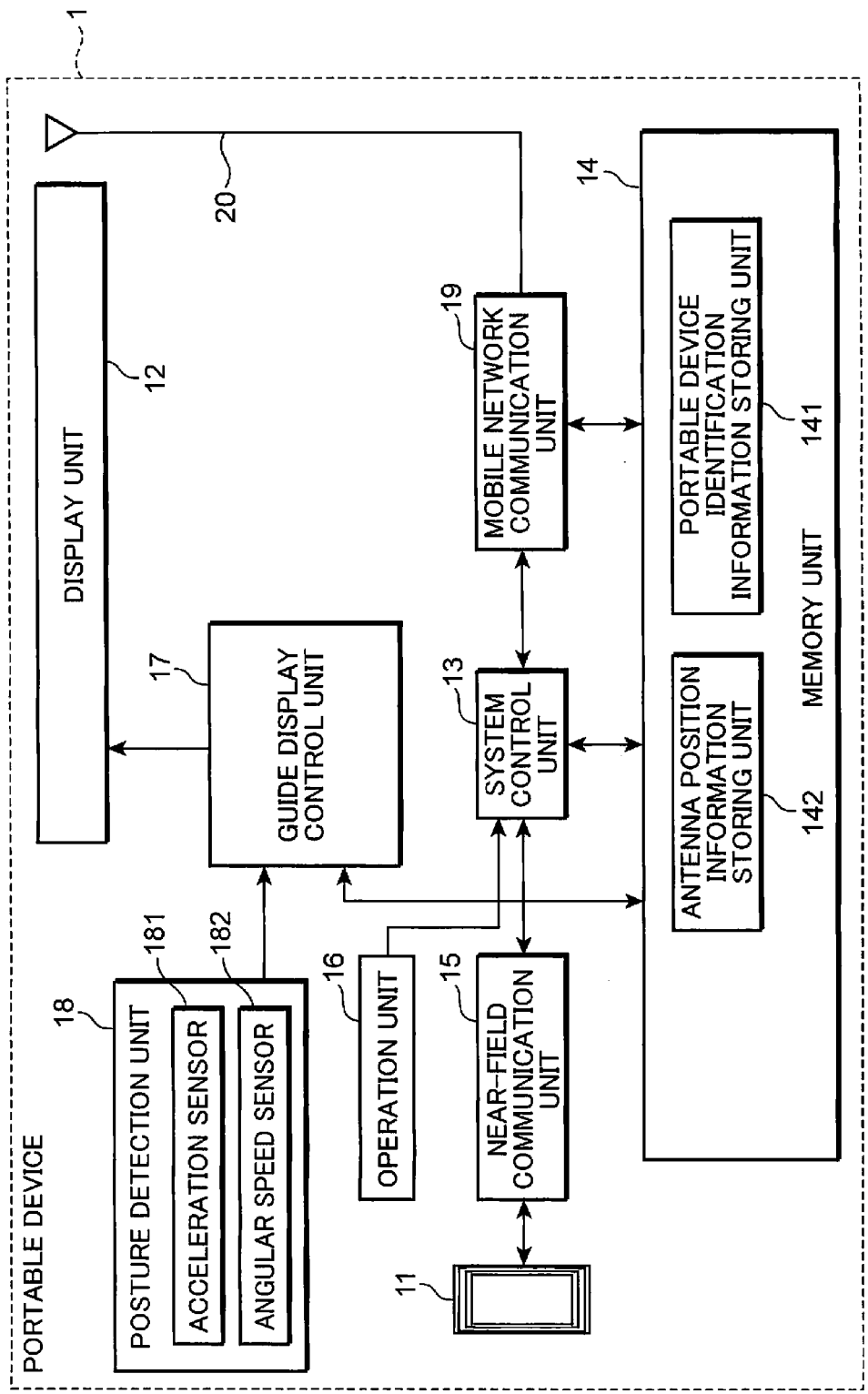

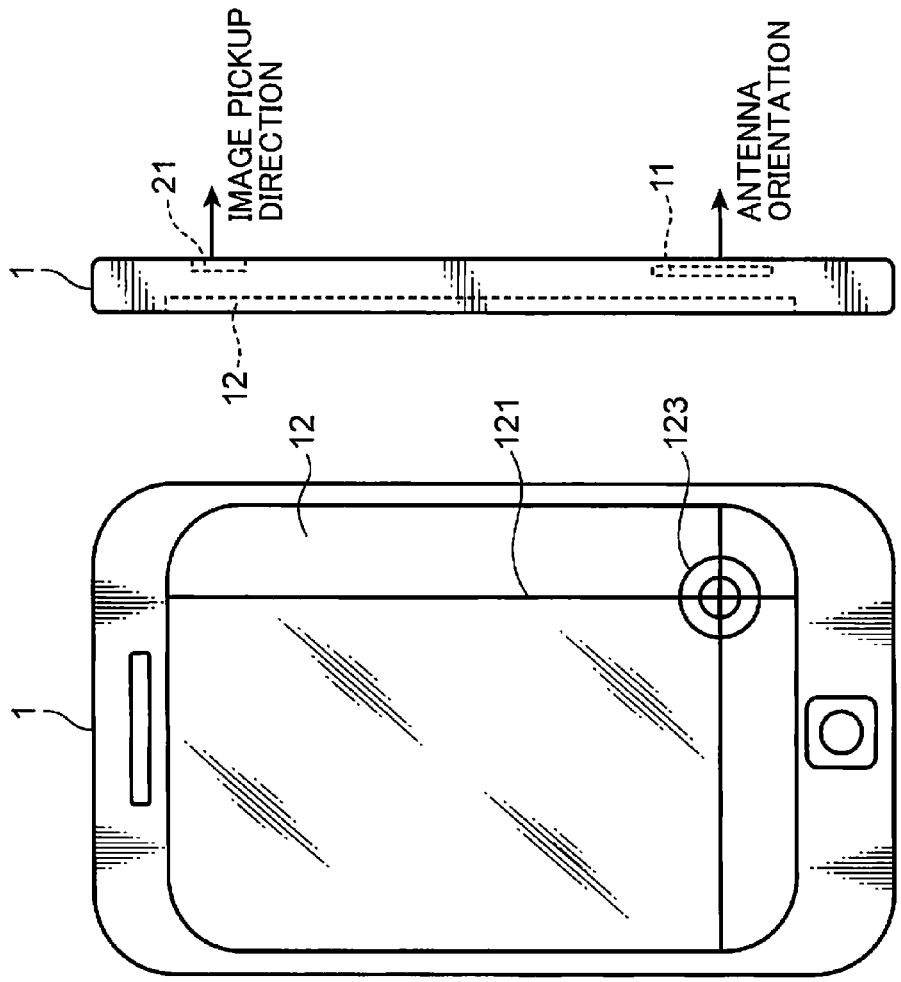
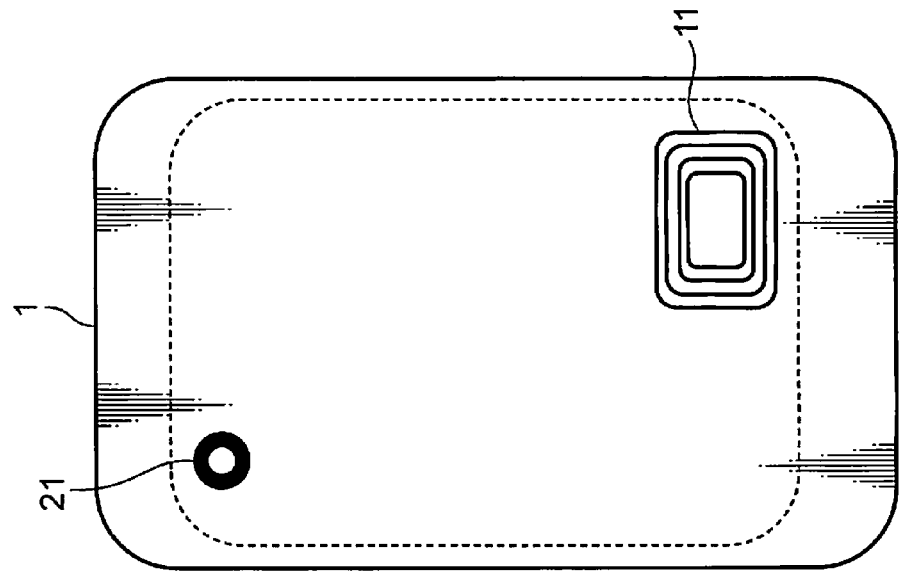

COMMUNICATION APPARATUS AND COMMUNICATION METHOD

TECHNICAL FIELD

The present invention relates to a communication apparatus and a communication method for performing communication with an external device by using near-field communication.

BACKGROUND ART

A technique for performing near-field communication between devices by using RFID (Radio Frequency Identification) has been suggested. In the near-field communication, the communication distance is short, and it is necessary to bring the antennas of two radio communication devices close to each other. A mark representing the position of the antenna is provided on the surface where the antenna of the radio communication device is mounted, and the user performs communication between the two radio communication devices by bringing the marks of two radio communication devices close to each other.

The mark indicating the position of the antenna is hidden in the shade of the radio communication device when the two radio communication devices are brought close to each other. Therefore, when the user performs communication between two radio communication devices, it is difficult to bring the antennas accurately close to each other. In particular, with the RFID incorporated in a cellular phone, the antenna output cannot be increased. Therefore, the antennas should be aligned in the units of several millimeters, and it is difficult to bring the antennas accurately close to each other.

Accordingly, for example, Patent Literature 1 discloses a portable communication terminal in which the position of the antenna for near-field communication that is incorporated in the case is additionally displayed on the display device. Further, for example, Patent Literature 2 discloses a radio communication apparatus in which a guide for matching the position of the antenna of another radio communication apparatus with the position of the host antenna is displayed on the display unit in combination with a real-time image that is picked up by an image pickup unit.

However, although the abovementioned Patent Literature 1 and Patent Literature 2 disclose the feature of displaying the antenna position, those documents do not disclose the feature of storing the information representing the antenna position.

The position of the antenna incorporated in a communication apparatus differs depending on the type of the communication apparatus. Therefore, the communication apparatus should store the information representing the position of the antenna of the communication apparatus, and when the information representing the antenna position is not stored, the position of the antenna incorporated in the communication apparatus cannot be indicated to the user.

CITATION LIST

Patent Literature

Patent Literature 1: Japanese Patent Application Publication No. 2009-33590

Patent Literature 2: Japanese Patent Application Publication No. 2010-109594

SUMMARY OF INVENTION

The present invention has been created to resolve the above-described problems and it is an object thereof to provide a communication apparatus and a communication method that can easily indicate the position of the antenna incorporated in the communication apparatus to the user and align the antenna of the communication apparatus with the antenna of an external device.

The communication apparatus according to one aspect of the present invention is a communication apparatus that communicates with an external device by using near-field communication, including: a loop antenna for performing near-field communication; a display unit provided on a side of the communication apparatus opposite an orientation of the loop antenna; and a position information storing unit that stores antenna position information representing a position of the loop antenna in the communication apparatus, wherein the display device displays the position of the loop antenna on the basis of the antenna position information stored in the position information storing unit.

In such a configuration, the display unit is provided on the side opposite that of the orientation of the loop antenna for performing near-field communication, and the position information storing unit stores antenna position information representing the position of the loop antenna in the communication apparatus. Further, the display device displays the position of the loop antenna on the basis of the antenna position information stored in the position information storing unit.

In accordance with the present invention, the position of the loop antenna is displayed on the basis of the antenna position information stored in the position information storing unit. Therefore, the position of the antenna incorporated in the communication apparatus can be indicated to the user, and the antenna of the communication apparatus can be easily aligned with the antenna of the external device.

The objects, features, and merits of the present invention will become more apparent from the following detailed explanation and appended drawings.

BRIEF DESCRIPTION OF DRAWINGS

FIG. 2A illustrates the rear surface side, as viewed through a transparent front surface side, of the portable device in Embodiment 1 of the present invention, FIG. 2B illustrates the front surface of the portable device in Embodiment 1 of the present invention, and FIG. 2C illustrates the side surface of the portable device in Embodiment 1 of the present invention.

FIG. 3 illustrates the internal configuration of the portable device in Embodiment 1 of the present invention.

FIG. 13A illustrates the rear surface side, as viewed through a transparent front surface side, of the portable device in Embodiment 3 of the present invention, FIG. 13B illustrates the front surface of the portable device in Embodiment 3 of the present invention, and FIG. 13C illustrates the side surface of the portable device in Embodiment 3 of the present invention.

DESCRIPTION OF EMBODIMENTS

Embodiments of the present invention will be explained hereinbelow with reference to the appended drawings. The below-described embodiments are examples of specific implementation of the present invention and are not indented to restrict the technical scope of the present invention.

Embodiment 1

In Embodiment 1, a portable device provided, for example, with a RFID reader/writer is brought close to a terminal device provided with a RFID, terminal device information representing information on the terminal device including ID or the like is read from the terminal device, information on the portable device itself is added to the terminal device information that has been read by the portable device, and the resultant information is transmitted to a server. As a result, for example, the terminal device information can be registered in a database on the server in association with the portable device information.

User registration operations such as the registration of mail address in a server and the registration of a production number in a server have been conventionally performed by direct input by the user. As a result, the number of terminal devices registered in the server is small due to the complexity of input processing operation. By contrast, in the portable device of Embodiment 1, information relating to a terminal device can be easily registered in the server database and therefore even a user who is not familiar with IT devices can perform the user registration operation easier, faster, and more intuitively. The number of terminal devices registered in databases can thus be expected to increase.

Figure 1:
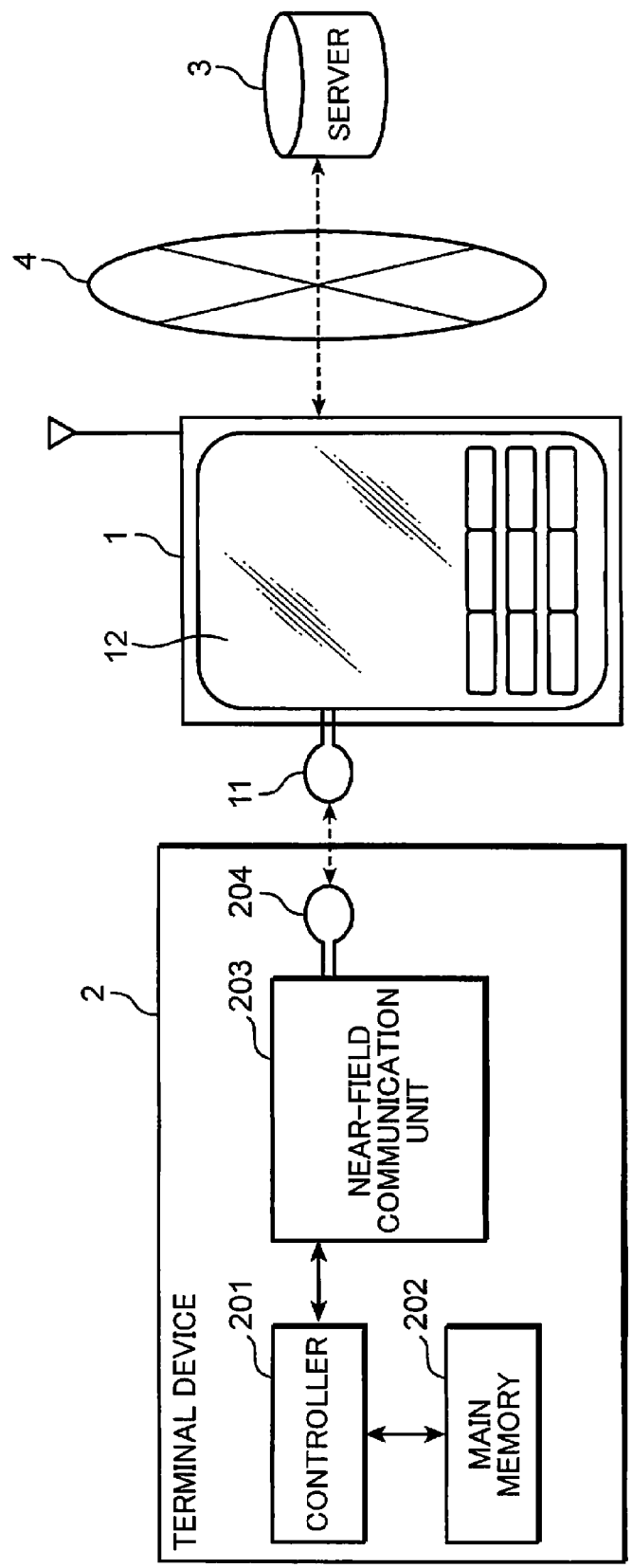
FIG. 1 illustrates the configuration of the communication system in Embodiment 1 of the present invention.

FIG. 1 illustrates the configuration of the communication system in Embodiment 1 of the present invention. The communication system shown in FIG. 1 is provided with a portable device 1, a terminal device 2, and a server 3.

The portable device 1 is constituted, for example, by a communication device such as a cellular phone, communicates with the terminal device 2 by using near-field communication via a loop antenna 11 and is communicatively connected to the server 3 via a network 4. The portable device 1 may be any device, provided that this device includes a reader/writer that can communicate with the RFID or NFC (Near field Communication) of the terminal device 2, but a portable device is preferred.

The terminal device 2 is constituted, for example, by an electric appliance such as a TV set, a refrigerator, a washing machine, and a microwave oven, and communicatively connected to the portable device 1 by near-field communication. The terminal device 2 may be not only an electric appliance, but also a household electric unit such as an in-house device and sensor that measures and detects environment in the house, and may be of any configuration, provided that it can communicate with a reader/writer by active/passive RFID or NFC. The terminal device 2 includes a controller 201, a main memory 202, a near-field communication unit 203, and a loop antenna 204.

The controller 201 is constituted by a CPU (central processing unit) or the like and controls the operation of the near-field communication unit 203 and also controls the main memory 202 according to information received via the near-field communication unit 203.

Terminal device identification information for identifying the terminal device 2, for example, the model number and serial number of the terminal device 2, is stored in advance, for example, during the production, in the main memory 202. The main memory 202 also stores internal information such as usage history of the terminal device 2 and failure information thereon. In order to register the terminal device in the server database, it is preferred that the main memory 202 include information that can specify the maker of the terminal device, information that can specify the production date, and information that can specify the production process. It is also preferred that the main memory 202 include server specific information (for example, an URL (Uniform Resource Identifier)) for accessing the server, each manufacturer of the terminal device 2 having different server specific information. As a result, the server 3 can be easily accessed from the portable device 1. Further, where the URL is stored in the main memory 202 of the terminal device 2, the portable telephone 1 can access the server inherent to the terminal device 2, regardless of the device type.

The near-field communication unit 203 transmits and receives various types of information to and from the portable device 1 by a bidirectional radio system via the loop antenna 204.

The loop antenna 204 is an antenna for near-field communication. In the present embodiment, a RFID or NFC in a HF zone using a 13.56 MHz band is assumed as the near-field communication, but such frequency band is not limiting. Thus, the frequency band of near-field communication may be a UHF band with a frequency of 90 MHz to 1 GHz or a band with a frequency above 2 GHz.

The server 3 is constituted by a well-known server computer or the like and communicatively connected to the portable device 1 via the network 4. The server 3 receives portable device identification information for identifying the portable device 1 and terminal device identification information for identifying the terminal device 2 from the portable device 1 and stores the received portable device identification information and terminal device identification information in association with each other.

FIG. 2 illustrate the external configurations of the portable device in Embodiment 1 of the present invention. FIG. 2A illustrates the rear surface side, as viewed through a transparent front surface side, of the portable device in Embodiment 1 of the present invention. FIG. 2B illustrates the front surface of the portable device in Embodiment 1 of the present invention. FIG. 2C illustrates the side surface of the portable device in Embodiment 1 of the present invention.

As shown in FIGS. 2A to 2C, the portable device 1 incorporates the loop antenna 11. A display unit 12 is provided on the front surface of the portable device 1. A guide line 121 indicating the position of the loop antenna 11 inside the portable device 1 is displayed on the display unit 12. The orientation of the loop antenna 11 is from the front surface toward the rear surface and the direction thereof is opposite that toward the display unit 12. In other words, the side opposite that of the orientation of the loop antenna 11 is the front surface.

FIG. 3 illustrates the internal configuration of the portable device in Embodiment 1 of the present invention. The portable device 1 shown in FIG. 3 is provided with a loop antenna 11, a display unit 12, a system control unit 13, a memory unit 14, a near-field communication unit 15, an operation unit 16, a guide display control unit 17, a posture detection unit 18, a mobile network communication unit 19, and an antenna 20.

The loop antenna 11 is incorporated in the portable device 1 and serves for near-field communication. The loop antenna 11 is disposed at a position that differs depending on the type of the portable device 1.

The display unit 12 is provided on the side opposite that of the orientation of the loop antenna 11 and displays various types of information. The loop antenna 11 is disposed within the display range of the display unit 12.

The system control unit 13 controls the entire portable device 1. The system control unit 13 controls the memory unit 14, the near-field communication unit 15, the guide display control unit 17, and the mobile network communication unit 19 on the basis of operations inputted by the operation unit 16.

The memory unit 14 is provided with a portable device identification information storing unit 141 and an antenna position information storing unit 142. The portable device identification information storing unit 141 stores portable device identification information for identifying the portable device 1. The portable device identification information is, for example, a production number or serial number of the portable device 1 and is stored in advance, for example, at the time of production date. The antenna position information storing unit 142 stores antenna position information that represents the position of the loop antenna 11 in the portable device 1. The antenna position information is acquired from the server 3 and stored in the antenna position information storing unit 142. The antenna position information storing unit 142 stores the coordinate position on the display unit 12 of the portable device 1 that corresponds to the position of the loop antenna 11 as the antenna position information. The coordinate position is, for example, a pixel position on the display unit 12. The antenna position information may be the information calculated from the position of the display unit 12 and the position of the loop antenna 11.

The near-field communication unit 15 communicates with the terminal device 2 via the loop antenna 11 by using near-field communication.

The operation unit 16 is constituted, for example, by a touch panel or operation keys, and receives input operations from the user.

The guide display control unit 17 controls the display unit 12 so as to display the position of the loop antenna 11 on the basis of the antenna position information that has been stored in the antenna position information storing unit 142.

The posture detection unit 18 is provided with an acceleration sensor 181 and an angular speed sensor 182. The acceleration sensor 181 detects the acceleration of the portable device 1, and the angular speed sensor 182 detects the angular speed of the portable device. The posture of the portable device 1 can be specified on the basis of the acceleration detected by the acceleration sensor 181 and the angular speed detected by the angular speed sensor 182. The guide display control unit 17 changes the inclination of the guide line 121 displayed on the display unit 12 on the basis of the acceleration detected by the acceleration sensor 181 and the angular speed detected by the angular speed sensor 182.

The antenna 20 serves for connection to the network 4. The mobile network communication unit 19 communicates with the server 3 via the network 4. The network 4 is, for example, a mobile body communication network. The mobile network communication unit 19 transmits the portable device identification information stored in the portable device identification information storing unit 141 to the server 3 connected via the network 4 and acquires the antenna position information corresponding to the portable device identification information from the server 3. The antenna position information storing unit 142 stores the antenna position information acquired by the mobile network communication unit 19.

Figure 4:
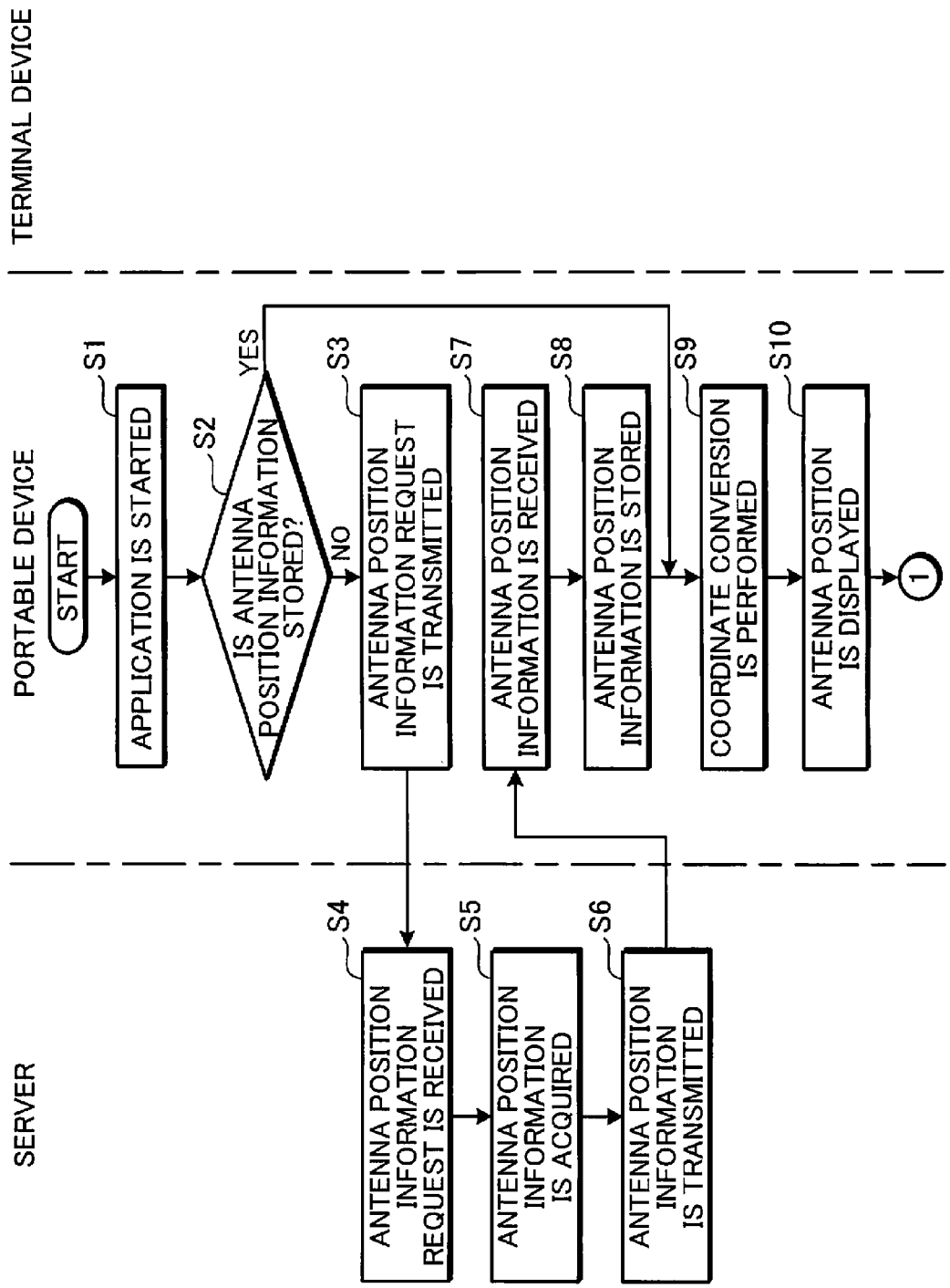
FIG. 4 is a first flowchart for illustrating the operation of the communication system in Embodiment 1 of the present invention.
Figure 5:
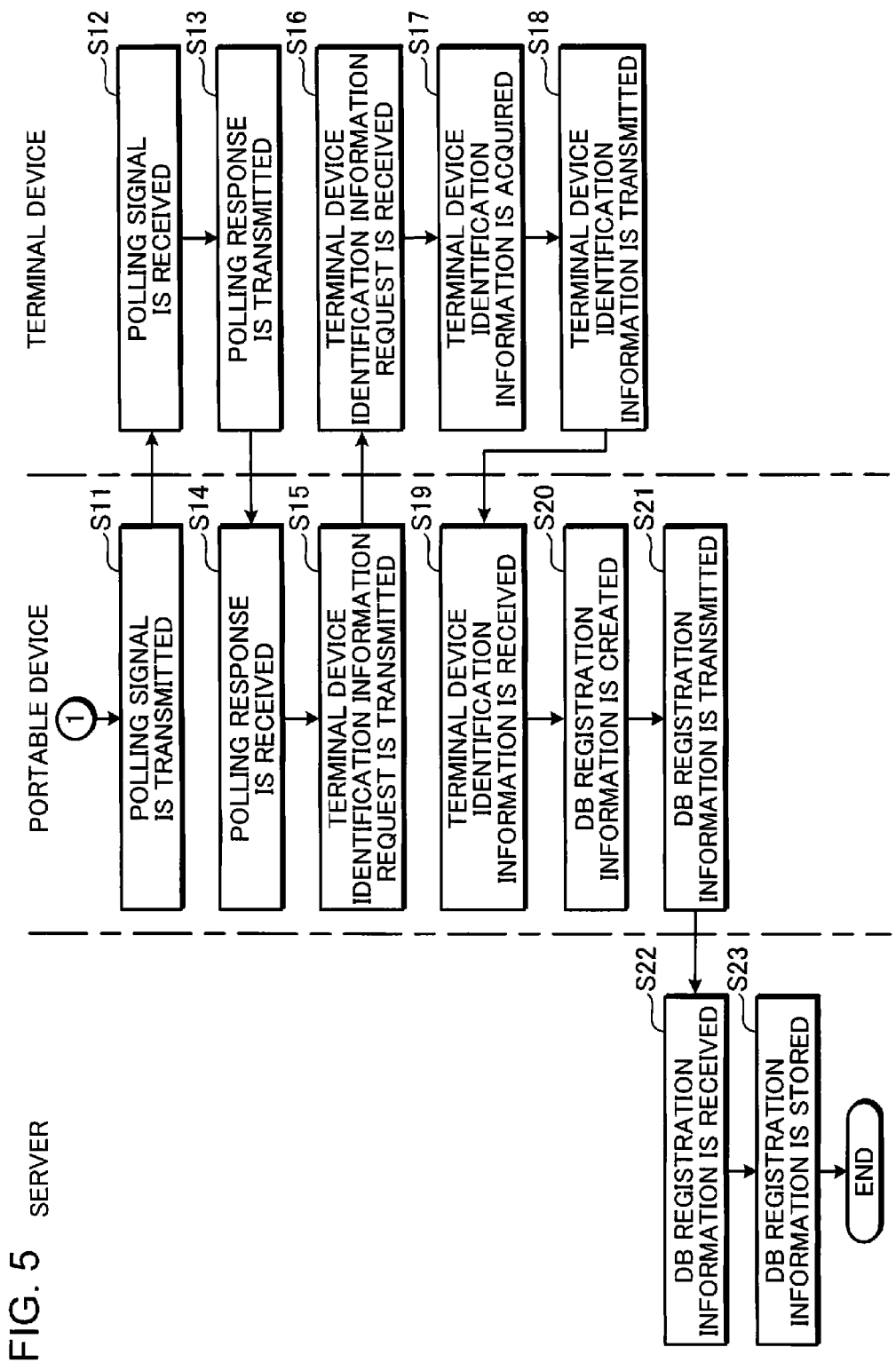
FIG. 5 is a second flowchart for illustrating the operation of the communication system in Embodiment 1 of the present invention.

The operation of the communication system in Embodiment 1 of the present invention will be explained below. FIGS. 4 and 5 are flowcharts illustrating the operation of the communication system in Embodiment 1 of the present invention.

In step S1, the system control unit 13 of the portable device 1 starts an application for displaying the position of the loop antenna 11 on the display unit 12. In this case, the operation unit 16 receives an instruction to start the application from the user. The system control unit 13 starts the application on the basis of the received start instruction.

Then, in step S2, the system control unit 13 determines whether or not the antenna position information has been stored in the antenna position information storing unit 142. When it is determined that the antenna position information has been stored (YES in step S2), the processing advances to step S9.

Meanwhile, when it is determined that the antenna position information has not been stored (NO in step S2), the mobile network communication unit 19 in step S3 transmits an antenna position information request for requesting antenna position information including the portable device identification information that has been read out from the portable device identification information storing unit 141 to the server 3.

Then, in step S4, the communication unit of the server 3 receives the antenna position information request transmitted by the portable device 1.

Then, in step S5, the control unit of the server 3 acquires the antenna position information corresponding to the portable device identification information included in the antenna position information request from an antenna position information management database. The antenna position information management database provided in the server 3 stores the antenna position information corresponding to the portable device identification information. The antenna position information management database stores the antenna position information for a terminal device of each type.

Then, in step S6, the communication unit of the server 3 transmits the antenna position information acquired from the antenna position information management database to the portable device 1.

Then, in step S7, the mobile network communication unit 19 of the portable device 1 receives the antenna position information transmitted by the server 3.

Then, in step S8, the mobile network communication unit 19 stores the received antenna position information in the antenna position information storing unit 142. The antenna position information storing unit 142 stores the antenna position information received by the mobile network communication unit 19.

Then, in step S9, the guide display control unit 17 reads the antenna position information from the antenna position information storing unit 142 and converts the antenna position information that has been read out into coordinate values to be displayed on the display unit 12. The guide display control unit 17 converts the coordinate position on the portable device 1 that is included in the antenna position information into coordinate values in the X-Y coordinate system for which the upper left pixel on the screen is a point of origin.

Then, in step S10, the guide display control unit 17 controls the display unit 12 so as to display the guide line 121 representing the position of the loop antenna 11 on the basis of the antenna position information stored in the antenna position information storing unit 142. The display unit 12 displays the guide line 121 on the display screen on the basis of the control of the guide display control unit 17. The guide line 121 is represented, for example, by two straight lines. The crossing point of the two straight lines represents the position of the loop antenna 11. The two straight lines are orthogonal to each other.

Figure 6:
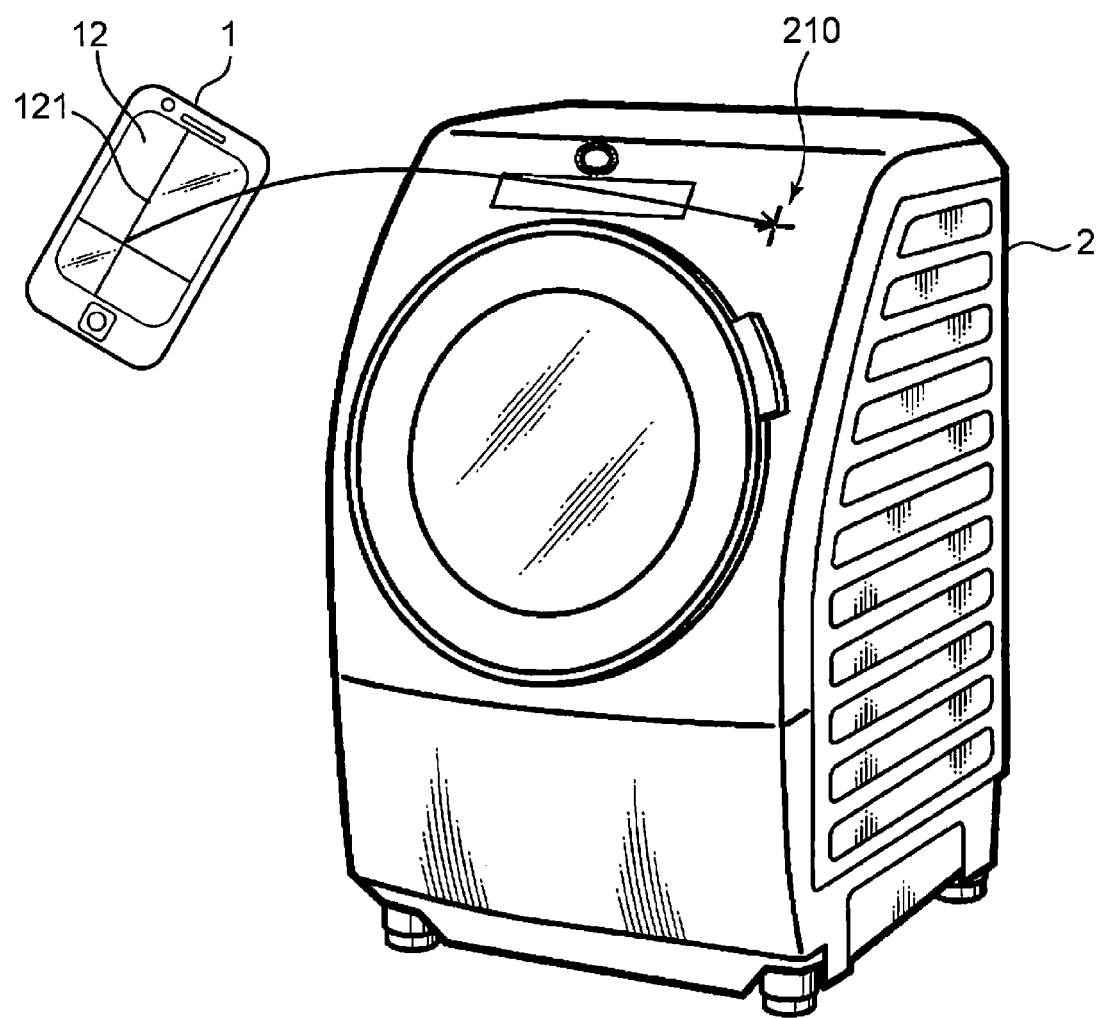
FIG. 6 is an explanatory drawing illustrating the operation of bringing the portable device close to the terminal device.

The operation of bringing the portable device 1 close to the terminal device 2 is explained below. FIG. 6 is an explanatory drawing illustrating the operation of bringing the portable device 1 close to the terminal device 2.

As shown in FIG. 6, a guide pattern 210 representing the position of the loop antenna 204 is formed on the front surface of the terminal device 2. The guide pattern 210 has the shape, for example, of a cross (+). In the present embodiment, the guide pattern 210 is displayed by lighting up, but the present invention is not limited to such a feature, and the guide pattern may be printed on the surface. Further, the color or lighting-up period of the guide pattern 201 may be changed according to the internal state of the terminal device 2. For example, in the usual state in which the terminal device does not communicate with the portable device 1, the guide pattern 210 is lighted up at all times, whereas in the state of communication with the portable device 1, the guide pattern 210 blinks.

The user brings the rear surface of the portable device 1 close to the guide pattern 210 of the terminal device 2, while observing the guide line 121 displayed on the display unit 12 of the portable device 1. The user brings the position corresponding to the crossing point position of guide line 121 on the rear surface of the portable device 1 close to the guide pattern 210. As a result, the portable device 1 and the terminal device 2 are communicatively connected to each other.

Returning to FIG. 5, the near-field communication unit 15 then transmits a polling signal via the loop antenna 11 to the terminal device 2 in step S11.

Then, in step S12, the near-field communication unit 203 of the terminal device 2 receives the polling signal via the loop antenna 204 from the portable device 1.

Then, in step S13, the near-field communication unit 203 transmits a polling response via the loop antenna 204 to the portable device 1.

Then, in step S14, the near-field communication unit 15 of the portable device 1 receives the polling response via the loop antenna 11 from the terminal device 2.

Then, in step S15, the near-field communication unit 15 transmits a terminal device identification information request for requesting the terminal device identification information for identifying the terminal device 2 to the terminal device 2.

Then, in step S16, the near-field communication unit 203 of the terminal device 2 receives the terminal device identification information request via the loop antenna 204 from the portable device 1.

Then, in step S17, the controller 201 acquires the terminal device identification information from the main memory 202 and outputs the acquired terminal device identification information to the near-field communication unit 203. The portable device identification information is, for example, a serial number of the terminal device 2. The terminal device identification information may include not only the serial number, but also the type or product name of the terminal device 2.

Then, in step S18, the near-field communication unit 203 transmits the terminal device identification information acquired by the controller 201 to the portable device 1 via the loop antenna 204.

Then, in step S19, the near-field communication unit 15 of the portable device 1 receives via the loop antenna 11 the terminal device identification information transmitted by the terminal device 2.

Then, in step S20, the system control unit 13 creates a DB (database) registration information in which the terminal device identification information received by the near-field communication unit 15 is associated with the portable device identification information stored in the portable device identification information storing unit 141. The system control unit 13 may also create DB registration information in which the terminal device identification information is associated not only with the portable device identification information, but also with the mail address of the portable device 1, the telephone number of the portable device 1, the name of the owner of the portable device 1, or the subscriber number stored in a SIM (Subscriber Identity Module) card.

Then, in step S21, the mobile network communication unit 19 transmits the DB registration information created by the system control unit 13 to the server 3 via the antenna 20.

Then, in step S22, the communication unit of the server 3 receives the DB registration information transmitted by the portable device 1.

Then, in step S23, the control unit of the server 3 registers the DB registration information transmitted by the portable device 1 in an owned device management database. The terminal device identification information is stored in association with the portable device identification information in the owned device management database of the server 3. The portable device identification information is used as the user identification information. A list of terminal devices owned by the user is managed in the owned device management database.

Thus, the position of the loop antenna 11 is displayed on the basis of the antenna position information stored in the antenna position information storing unit 142. As a result, the position of the loop antenna incorporated in the portable device 1 can be shown to the user, and the antenna of the portable device 1 and the antenna of the terminal device 2 can be easily aligned.

Further, since the antenna position information corresponding to the portable device identification information is acquired from the server 3, even in the case of the portable device 1 for which the antenna position information has not been stored at the time of shipping, the antenna position information can be thereafter acquired. Further, each device type has a different position of the loop antenna 11, but the antenna position information corresponding to the portable device 1 can be acquired.

Each type of portable devices usually has a different attachment position of the loop antenna 11 for near-field communication. According to the invention of the present embodiment, the loop antenna position information for each type of portable devices can be acquired and stored, and the loop antenna position can be displayed on the display device 12. As a result, even when the type of the portable device used by the user is changed, the loop antenna position corresponding to the portable device type can be displayed on the display. Therefore the usability similar to that before the portable device type has been changed can be provided.

Embodiment 2

The communication system of Embodiment 2 of the present invention will be described below. In Embodiment 2, a guide pattern image of the same shape as the guide pattern representing the position of the loop antenna mounted on the terminal device is displayed at the position of the loop antenna mounted on the portable device.

Figure 7:
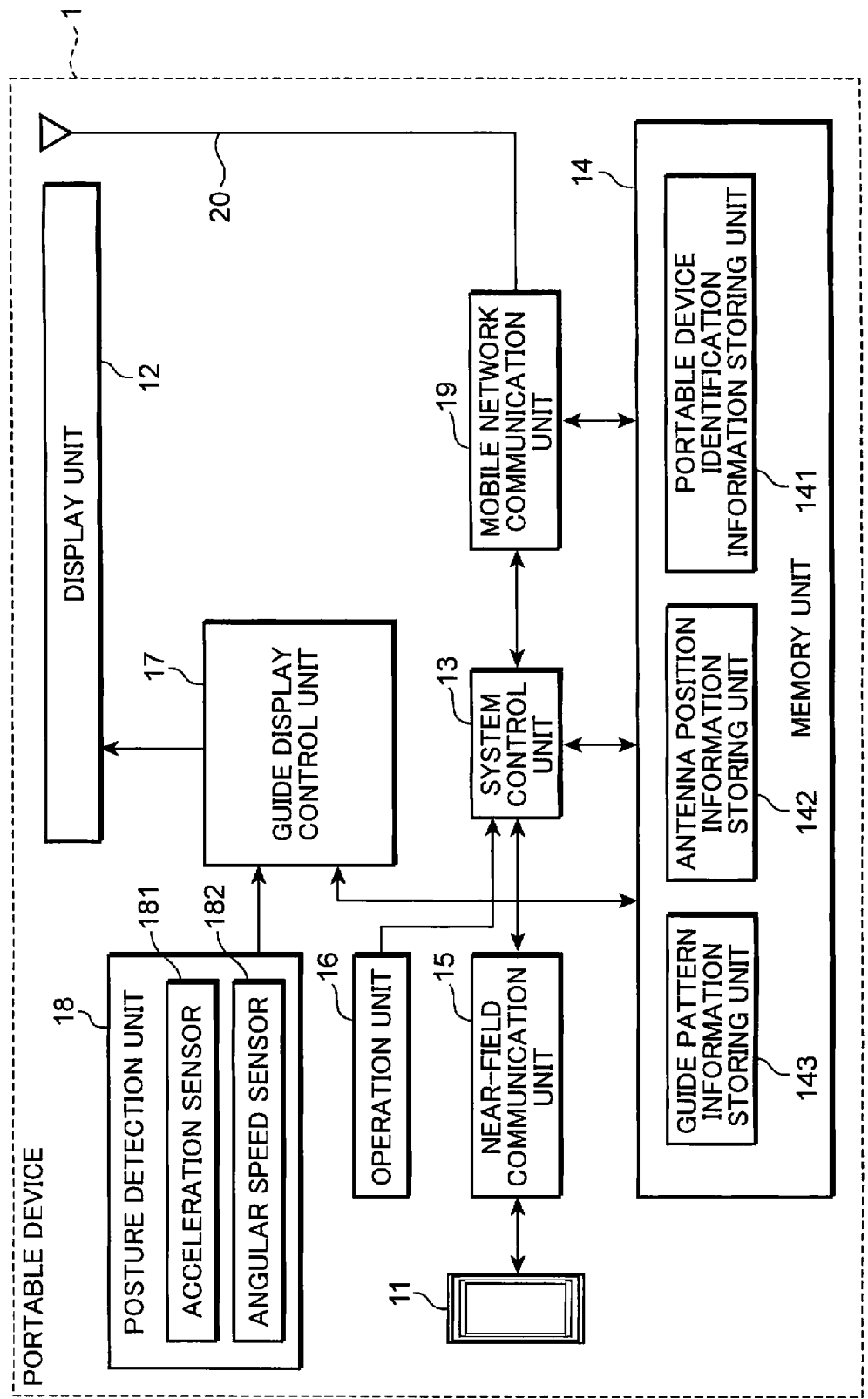
FIG. 7 illustrates the internal configuration of the portable device in Embodiment 2 of the present invention.

FIG. 7 illustrates the internal configuration of the portable device in Embodiment 2 of the present invention. The configuration of the communication system in Embodiment 2 of the present invention is identical to the configuration of the communication system in Embodiment 1 and the explanation thereof is herein omitted.

A portable device 1 shown in FIG. 7 is provided with a loop antenna 11, a display unit 12, a system control unit 13, a memory unit 14, a near-field communication unit 15, an operation unit 16, a guide display control unit 17, a posture detection unit 18, a mobile network communication unit 19, and an antenna 20. The memory unit 14 is provided with a portable device identification information storing unit 141, an antenna position information storing unit 142, and a guide pattern information storing unit 143. In the portable device of Embodiment 2, the components identical to those of the portable device of Embodiment 1 are assigned with same reference numerals and the explanation thereof is herein omitted.

The portable device of Embodiment 2 differs from the portable device of Embodiment 1 in that the memory unit 14 is provided with the guide pattern information storing unit 143.

The guide pattern information storing unit 143 stores guide patterns that are different for different terminal devices in association with terminal device identification information. The guide pattern information storing unit 143 stores a guide pattern information table in which terminal device identification information is associated with guide patterns.

Figure 8:
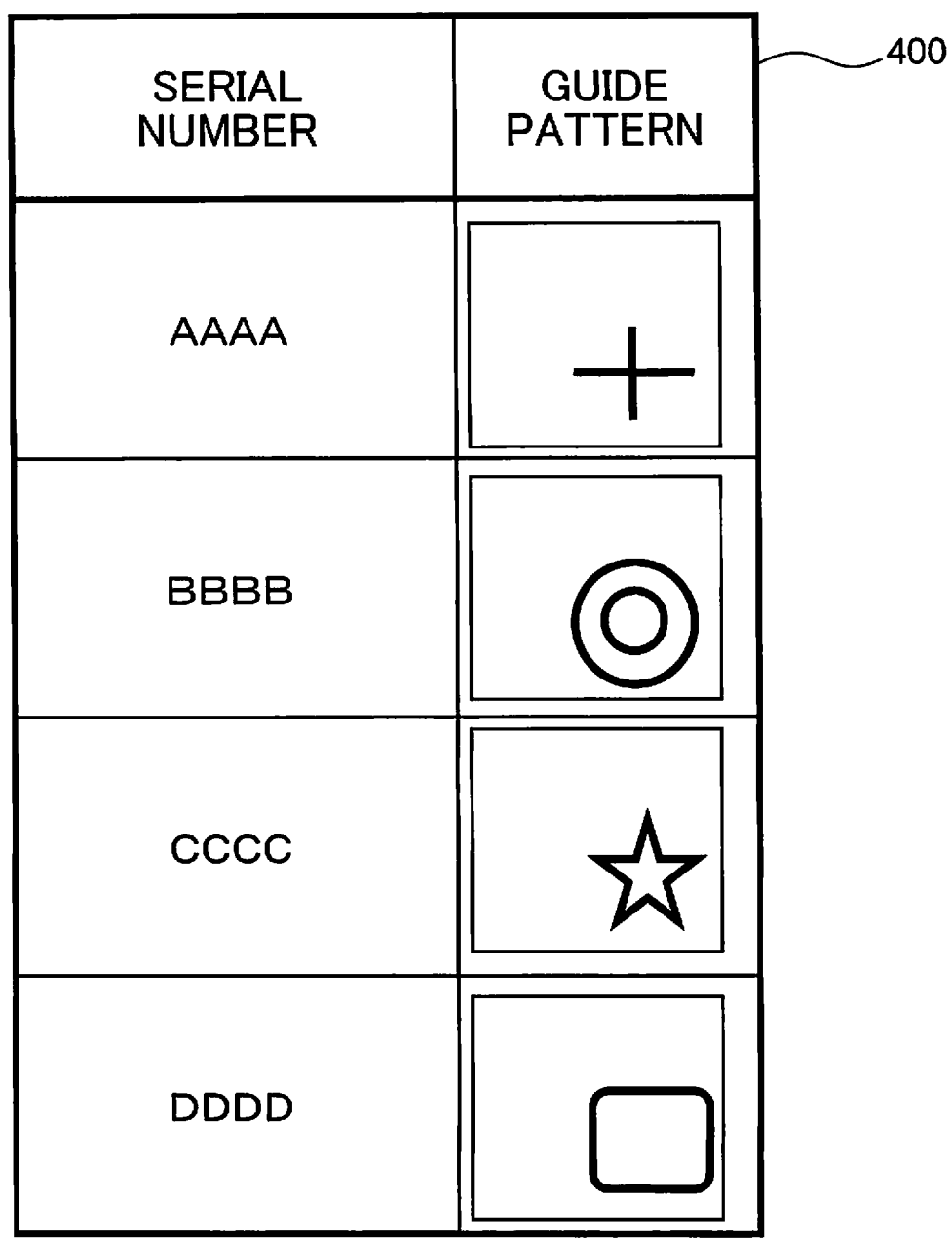
FIG. 8 shows an example of the guide pattern information table stored in the guide pattern information storing unit.

FIG. 8 shows an example of the guide pattern information table stored in the guide pattern information storing unit 143. As shown in FIG. 8, a guide pattern information table 400 stores serial numbers (terminal device identification number) in association with guide patterns. For example, a cross-shaped guide pattern is associated with the serial number "AAAA". A guide pattern in the form of a double circle is associated with the serial number "BBBB". A star-shaped guide pattern is associated with the serial number "CCCC". A rectangular guide pattern is associated with the serial number "DDDD". Those guide patterns are identical in shape to those formed on the surface of the terminal device 2 and differ for each terminal device.

The operation unit 16 receives the selection of the terminal device performing near-field ratio communication. The mobile network communication unit 19 transmits terminal device identification information for identifying the terminal device selected by the operation unit 16 to the server 3 and acquires a guide pattern corresponding to the terminal device identification information.

The display unit 12 displays the guide pattern acquired by the mobile network communication unit 19 as the position of the loop antenna.

Figure 9:
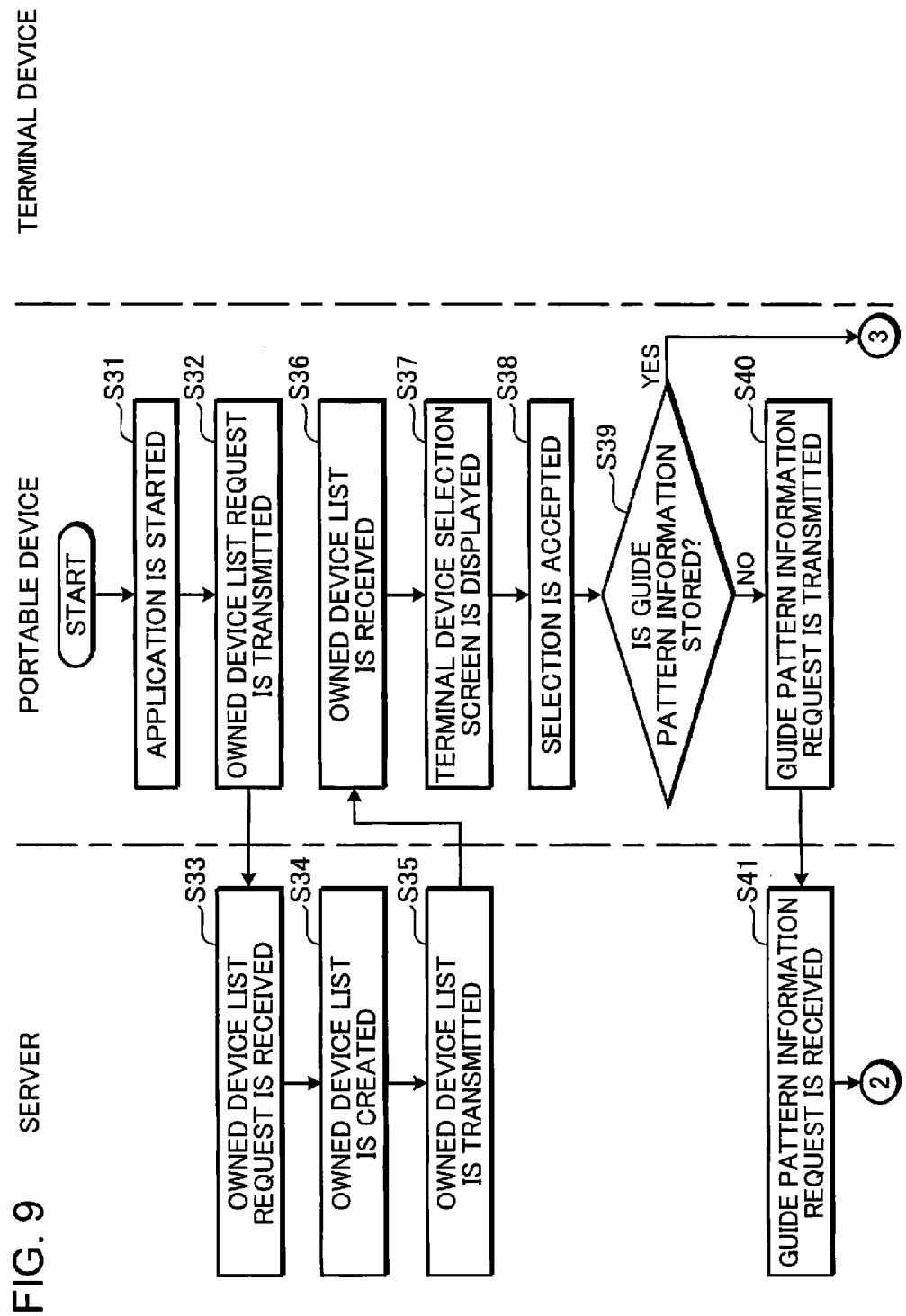
FIG. 9 is a first flowchart for illustrating the operation of the communication system in Embodiment 2 of the present invention.
Figure 10:
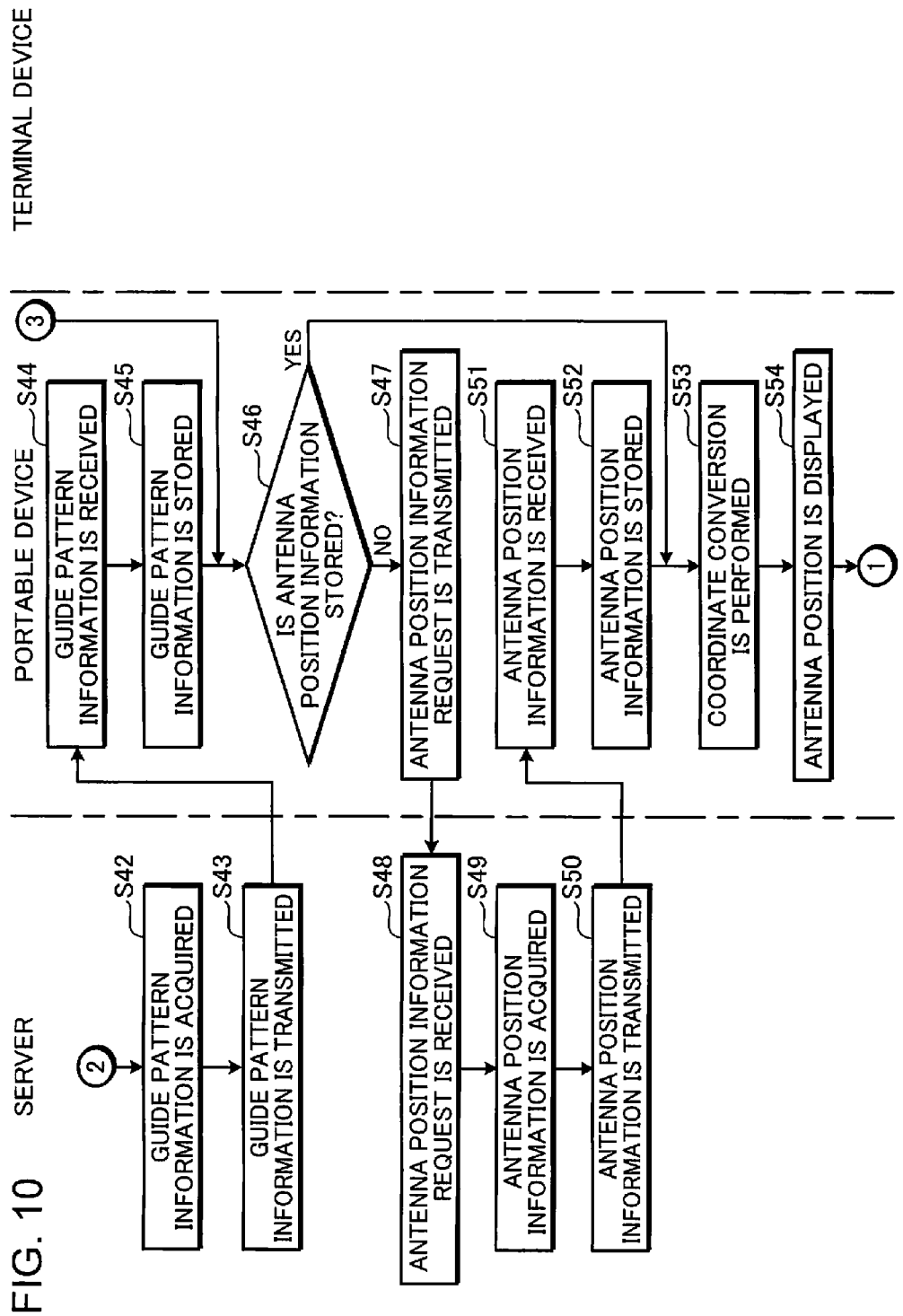
FIG. 10 is a second flowchart for illustrating the operation of the communication system in Embodiment 2 of the present invention.

The operation of the communication system of Embodiment 2 of the present invention is explained below. FIGS. 9 and 10 are flowcharts illustrating the operation of the communication system of Embodiment 2 of the present invention.

First, in step S31, the system control unit 13 of the portable device 1 starts an application for displaying the position of the loop antenna 11 on the display unit 12. In this case, the operation unit 16 receives an instruction to start the application from the user. The system control unit 13 starts the application on the basis of the received start instruction.

Then, in step S32, the mobile network communication unit 19 transmits, to the server 3, an owned device list request for requesting an owned device list that represents the terminal devices owned by the user. The owned device list request includes terminal device identification information for identifying the portable device 1.

Then, in step S33, the communication unit of the server 3 receives the owned device list request transmitted by the portable device 1.

Then, in step S34, the control unit of the server 3 extracts the terminal device identification information corresponding to the portable device identification information included in the owned device list request from the owned device management database and creates the extracted terminal device identification information as the owned device list. The terminal device identification information and portable device identification information are stored in the owned device management database in association with each other.

Then, in step S35, the communication unit of the server 3 transmits the owned device list created by the control unit to the portable device 1.

Then, in step S36, the mobile network communication unit 19 of the portable device 1 receives the owned device list transmitted by the server 3.

Then, in step S37, the guide display control unit 17 controls the display device 12 so as to display a terminal device selection screen for selecting one terminal device from the owned device list received by the mobile network communication unit 19. The display device 12 displays the terminal device selection screen under the control performed by the guide display control unit 17.

Figure 11:
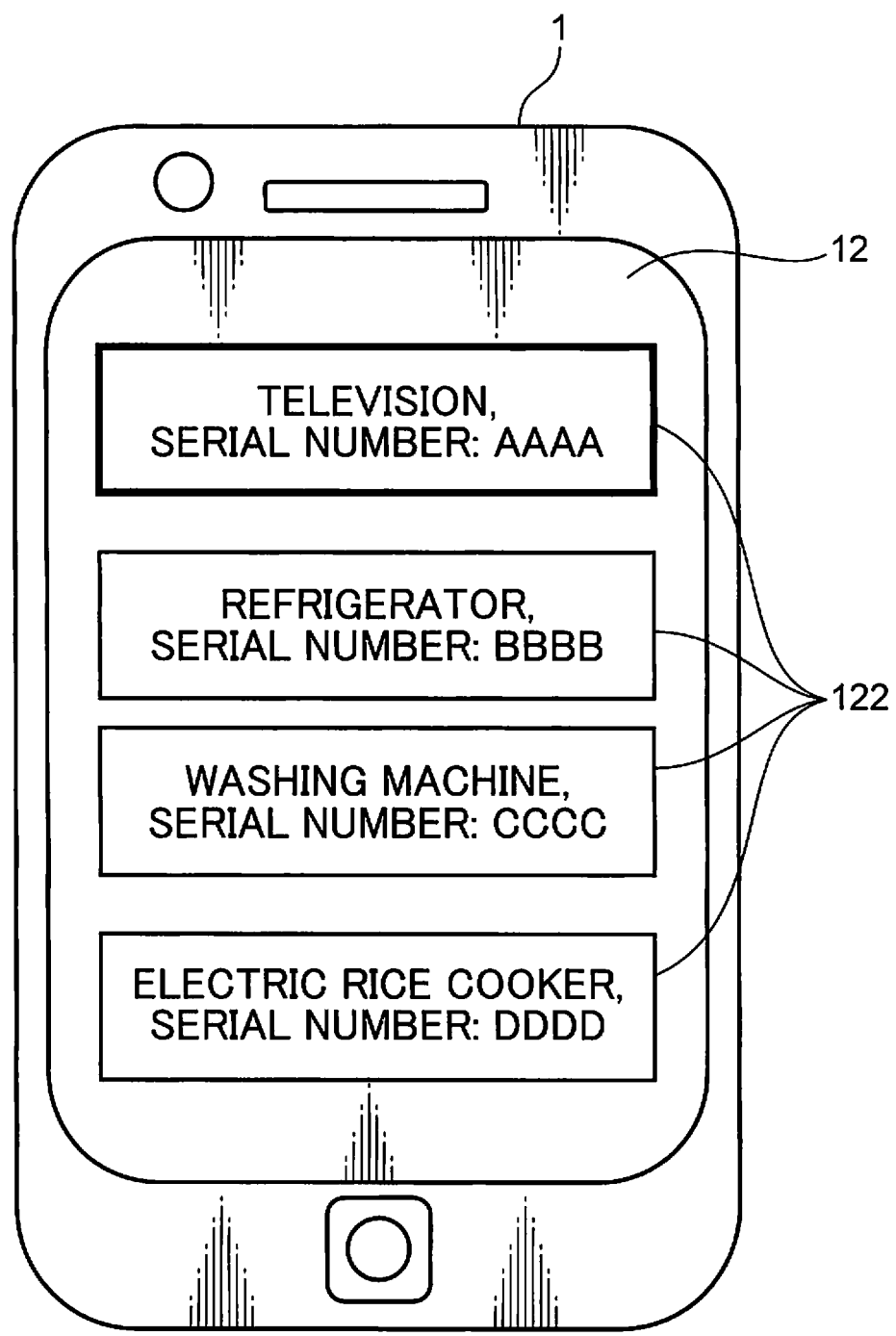
FIG. 11 illustrates an example of the terminal device selection screen displayed on the display unit.

FIG. 11 illustrates an example of the terminal device selection screen displayed on the display unit. The type names and serial numbers of the terminal devices are selectably displayed on the terminal device selection screen. In the terminal device selection screen shown in FIG. 11, four selection items 122 representing selectable terminal devices are displayed. The selection items 122 are, for example, "TELEVISION, SERIAL NUMBER: AAAA", "REFRIGERATOR, SERIAL NUMBER: BBBB", "WASHING MACHINE, SERIAL NUMBER CCCC", AND "ELECTRIC RICE COOKER, SERIAL NUMBER: DDDD".

Then, in step S38, the operation unit 16 receives the selection of the terminal device performing near-field communication from among the terminal devices displayed on the terminal device selection screen.

The user selects the terminal device performing near-field communication from among the selection items 122 displayed on the display screen 12. The operation unit 16 accepts the selection operation of the terminal device performed by the user. Where the display unit 12 is a touch panel, the desired selection item can be selected by touching the display screen. When the display unit 12 is not a touch panel, the desired selection item can be selected by operating the operation member provided at the portable device 1.

Then, in step S39, the system control unit 13 determines whether or not the guide pattern information on the terminal device that has been selected by the user is stored in the guide pattern information storing device 143. In this case, where it is determined that the guide pattern information has been stored (YES in step S39), the processing advances to step S46.

Meanwhile, where it is determined that the guide pattern information has not been stored (NO in step S39), in step S40, the mobile network communication unit 19 transmits the guide pattern information request for requesting the guide pattern information, this request including the terminal device identification information on the terminal device selected by the user, to the server 3. The type (model) of the terminal device may be included in the terminal device identification information.

Then, in step S41, the communication unit of the server 3 receives the guide pattern information request transmitted by the portable device 1.

Then, in step S42, the control unit of the server 3 acquires the guide pattern information corresponding to the terminal device identification information included in the guide pattern information request from the guide pattern information management database. The guide pattern information to be associated with the terminal device identification information is stored in the guide pattern information management database provided in the server 3. The guide pattern information management database stores the guide pattern information for each serial number of terminal devices. The guide pattern information management database may also store the guide pattern information for each type (model) of terminal devices.

Further, in step S43, the communication unit of the server 3 transmits the guide pattern information acquired from the guide pattern information management database to the portable device 1.

Then, in step S44, the mobile network communication unit 19 of the portable device 1 receives the guide pattern information transmitted from the server 3.

Then, in step S45, the mobile network communication unit 19 stores the received guide pattern information in the guide pattern information storing unit 143. The guide pattern information storing unit 143 stores the guide pattern information received by the mobile network communication unit 19. The guide pattern information may be stored in the guide pattern information storing unit 143 in advance, when the portable device 1 is manufactured.

The processing of steps S46 to S53 is similar to the processing of steps S2 to S9 shown in FIG. 4 and the explanation thereof is herein omitted.

Then, in step S54, the guide display control unit 17 controls the display unit 12 so that the guide pattern image representing the guide pattern stored in the guide pattern information storing unit 143 is displayed at the position of the loop antenna 11. The guide display control unit 17 reads the guide pattern image corresponding to the terminal device 2 selected by the user from the guide pattern information storing unit 143. Then, the guide display control unit 17 controls the display unit 12 so that guide pattern image that has been read out is displayed at the position of the loop antenna 11 specified by the antenna position information. The display unit 12 displays the guide pattern image on the display screen on the basis of the control performed by the guide display control unit 17. The guide pattern image represents the position of the loop antenna 11.

The processing of step S55 and subsequent steps is similar to that of steps S11 to S23 shown in FIG. 5 and the explanation thereof is herein omitted.

Since the guide pattern acquired by the mobile network communication unit 19 is thus displayed as the position of the loop antenna 11, the user can search for the guide pattern of the terminal device 2 by checking the guide pattern displayed on the display unit 12 of the portable device 1 and can easily align the antenna of the portable device 1 with the antenna of the terminal device 2.

The pattern that can be formed on the surface usually differs depending on the type of the terminal device. For example, in the case of a terminal device with a large number of flat surfaces, such as a refrigerator, a cross-shaped guide pattern can be formed. Meanwhile, for a terminal device with a large number of curved surfaces, such as an electric rice cooker, a round pattern is more suitable than the cross-shaped pattern. This is because the round pattern is less affected by a curved surface.

According to the invention of the present embodiment, even when a respective guide pattern is formed according to the surface shape or color of the terminal device, the guide pattern corresponding to the respective terminal device can be displayed on the display unit 12 by acquiring from the server the guide pattern which is specific to each terminal device that is being approached.

Embodiment 3

The communication system of Embodiment 3 of the present invention will be described below. In Embodiment 3, the position of the loop antenna is displayed in superposition on the picked-up image of the orientation of the loop antenna.

Figure 12:
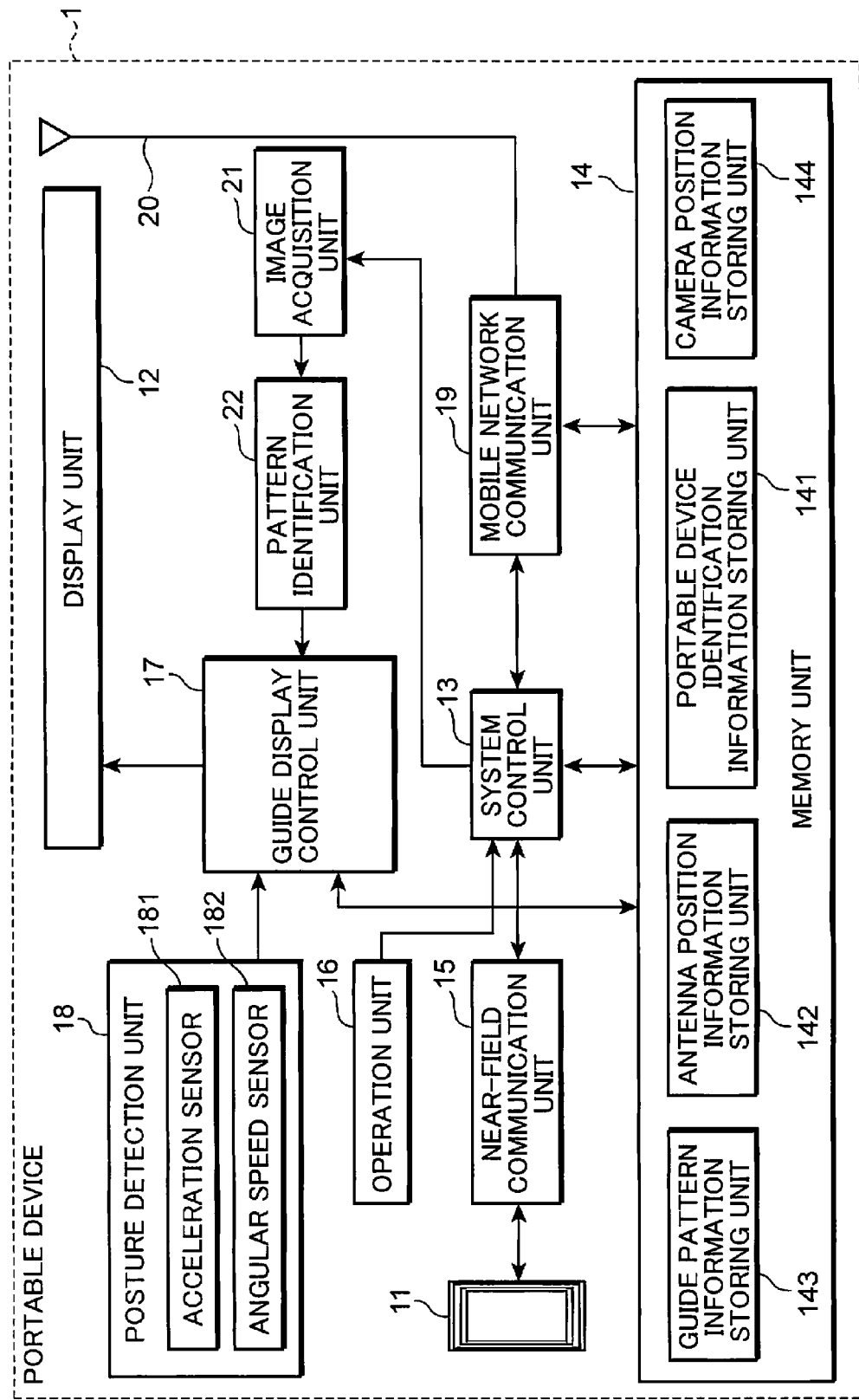
FIG. 12 illustrates the internal configuration of the portable device in Embodiment 3 of the present invention.

FIG. 12 illustrates the internal configuration of the portable device in Embodiment 3 of the present invention. The configuration of the communication system in Embodiment 3 of the present invention is identical to the configuration of the communication system in Embodiment 1 and the explanation thereof is herein omitted.

A portable device 1 shown in FIG. 12 is provided with a loop antenna 11, a display unit 12, a system control unit 13, a memory unit 14, a near-field communication unit 15, an operation unit 16, a guide display control unit 17, a posture detection unit 18, a mobile network communication unit 19, an antenna 20, an image acquisition unit 21, and a pattern identification unit 22. The memory unit 14 is provided with a portable device identification information storing unit 141, an antenna position information storing unit 142, a guide pattern information storing unit 143, and a camera position information storing unit 144. In the portable device of Embodiment 3, the components identical to those of the portable devices of Embodiment 1 and Embodiment 2 are assigned with same reference numerals and the explanation thereof is herein omitted.

The portable device of Embodiment 3 differs from the portable device of Embodiment 2 in that the portable device 1 is provided with the image acquisition unit 21 and the pattern identification unit 22 and that the memory unit 14 has the camera position information storing unit 144.

The image acquisition unit 21 is constituted, for example, by a CCD (Charge Coupled Device) camera and acquires the image of the orientation of the loop antenna 11. The image acquisition unit 21 is disposed at a position that differs depending on the type of the portable device 1.

The pattern identification unit 22 identifies a pattern that matches the guide pattern stored in the guide pattern information storing unit 143 from the image acquired by the image acquisition unit 21.

The camera position information storing unit 144 stores the camera position information representing the position of the image acquisition unit 21 in the portable device 1. The camera position information storing unit 144 stores the coordinate position on the portable device 1 that corresponds to the position of the image acquisition unit 21 as the camera position information. The system of coordinates of the coordinate position that represents the camera position information is identical to the system of coordinates of the coordinate position representing the antenna position information. The mobile network communication unit 19 acquires the antenna position information and also acquires the camera position information.

The display unit 12 displays the position of the loop antenna 11 in superposition on the image acquired by the image acquisition unit 21. The display unit 12 also displays the position of the loop antenna 11 according to the antenna position information and camera position information. Further, the display unit 12 displays the position of the loop antenna 11 according to the distance between the portable device 1 and the terminal device 2. Furthermore, the display unit 12 displays the position of the loop antenna 11 according to the size of the guide pattern included in the image acquired by the image acquisition unit 21.

FIGS. 13 illustrate the external appearances of the portable device in Embodiment 3 of the present invention. FIG. 13A illustrates the rear surface side, as viewed through a transparent front surface side, of the portable device in Embodiment 3 of the present invention. FIG. 13B illustrates the front surface of the portable device in Embodiment 3 of the present invention. FIG. 13C illustrates the side surface of the portable device in Embodiment 3 of the present invention.

As shown in FIGS. 13A to 13C, the display unit 12 is provided on the front surface of the portable device 1. The portable device 1 incorporates the loop antenna 11. In Embodiment 1, the loop antenna 11 is disposed within the display range of the display unit 12, but Embodiment 3 of the present invention is not limited to such a configuration and the loop antenna may be disposed outside the display range of the display unit 12.

The image acquisition unit 21 is disposed on the rear surface of the portable device 1. In Embodiment 3, the image acquisition unit 21 is disposed in the upper left end portion, as viewed from the front surface side of the portable device 1, but the present invention is not specifically limited to such a configuration. The orientation of the loop antenna 11 is in the direction from the front surface toward the rear surface and the direction thereof is opposite that toward the display unit. The orientation of the loop antenna 11 matches the image pickup direction of the image acquisition unit 21.

In the display unit 12, a guide line 121 indicating the position of the loop antenna 11 in the portable device 1 is displayed in superposition on the image acquired by the image acquisition unit 21. When the portable device 1 and the terminal device 2 are brought close to each other, the display unit 12 displays a guide pattern image 123, which is a pattern identical to the guide pattern formed on the surface of the terminal device 2, instead of the image acquired by the image acquisition unit 21.

Figure 14:
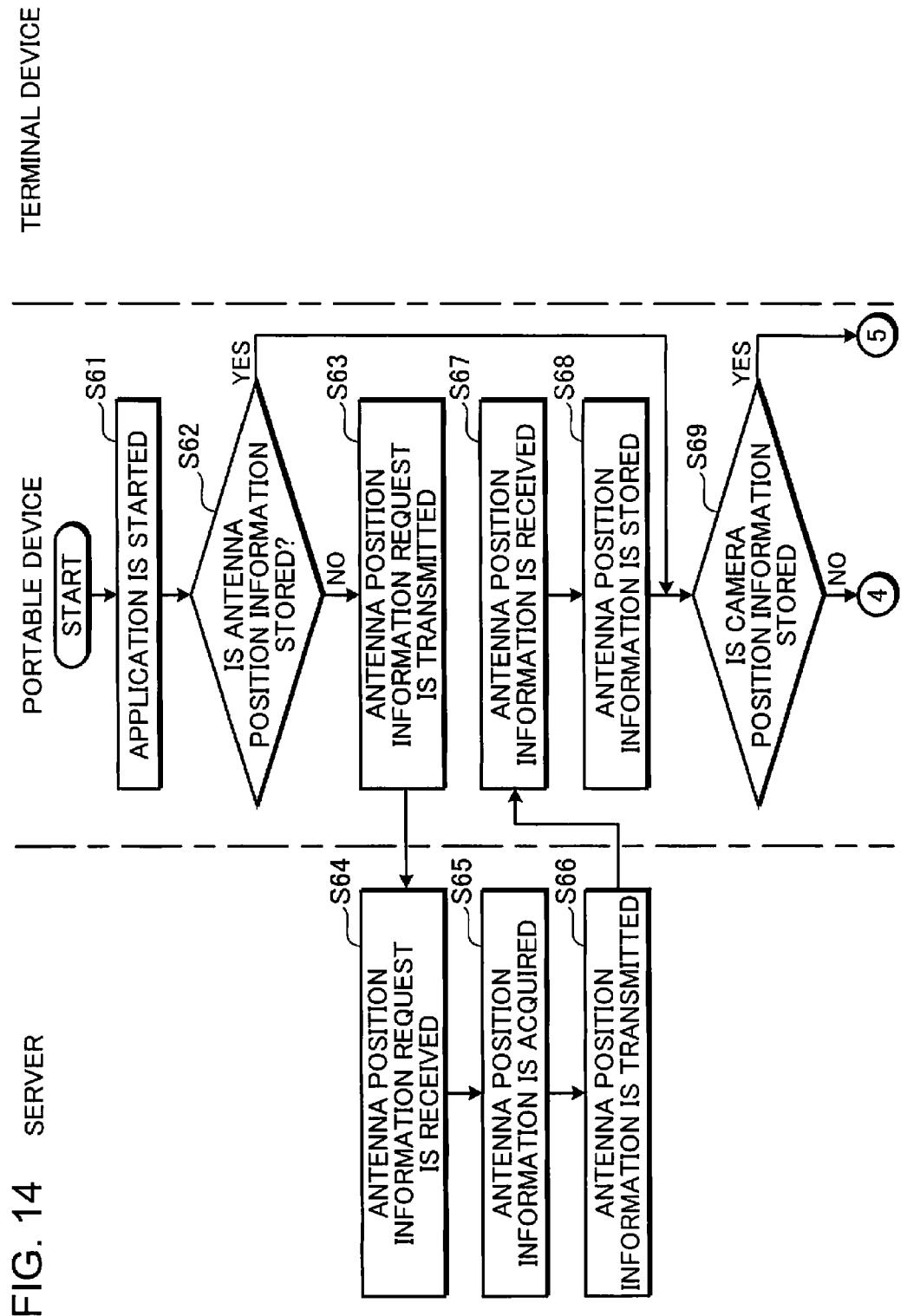
FIG. 14 is a first flowchart for illustrating the operation of the communication system in Embodiment 3 of the present invention.
Figure 15:
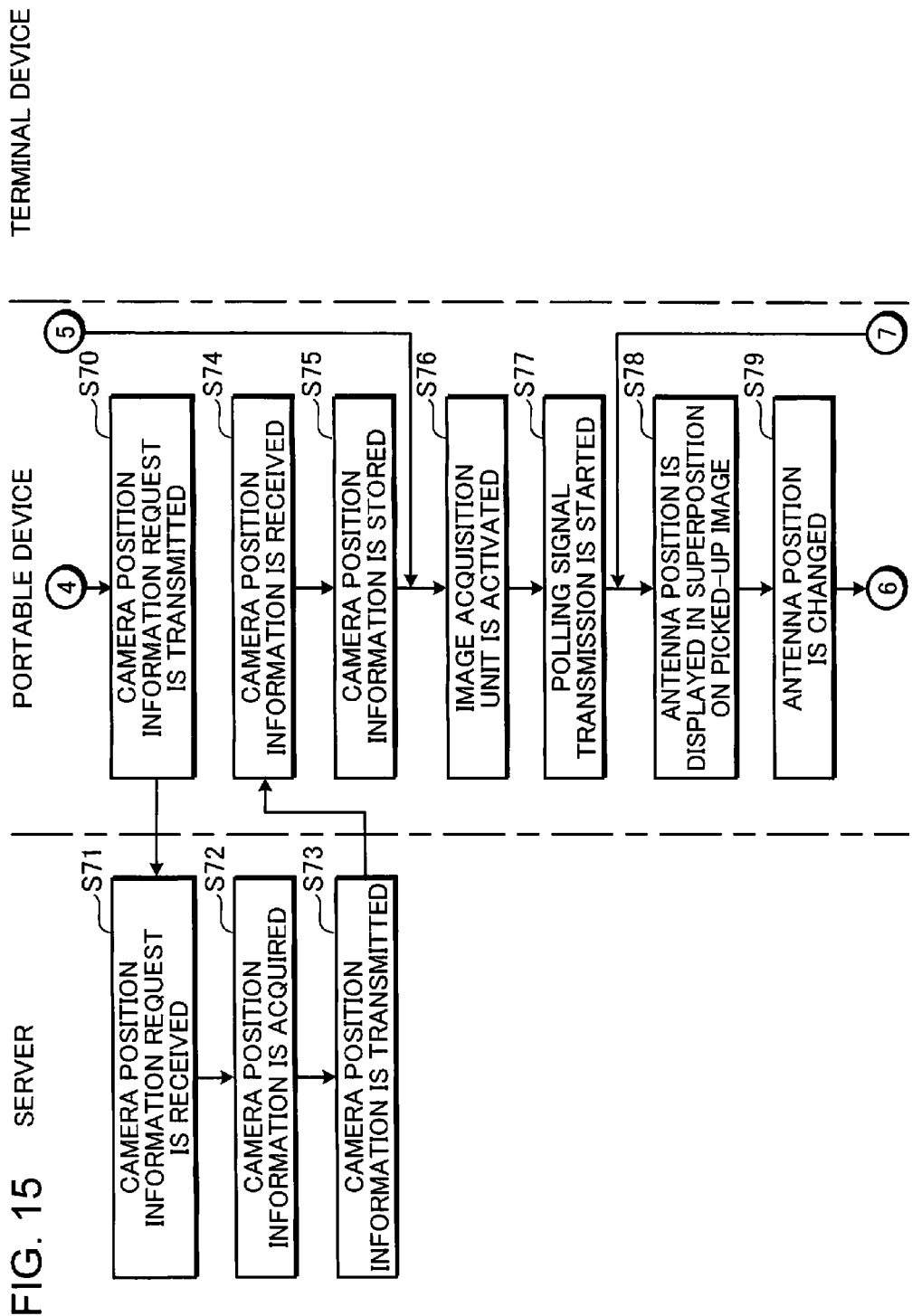
FIG. 15 is a second flowchart for illustrating the operation of the communication system in Embodiment 3 of the present invention.
Figure 16:
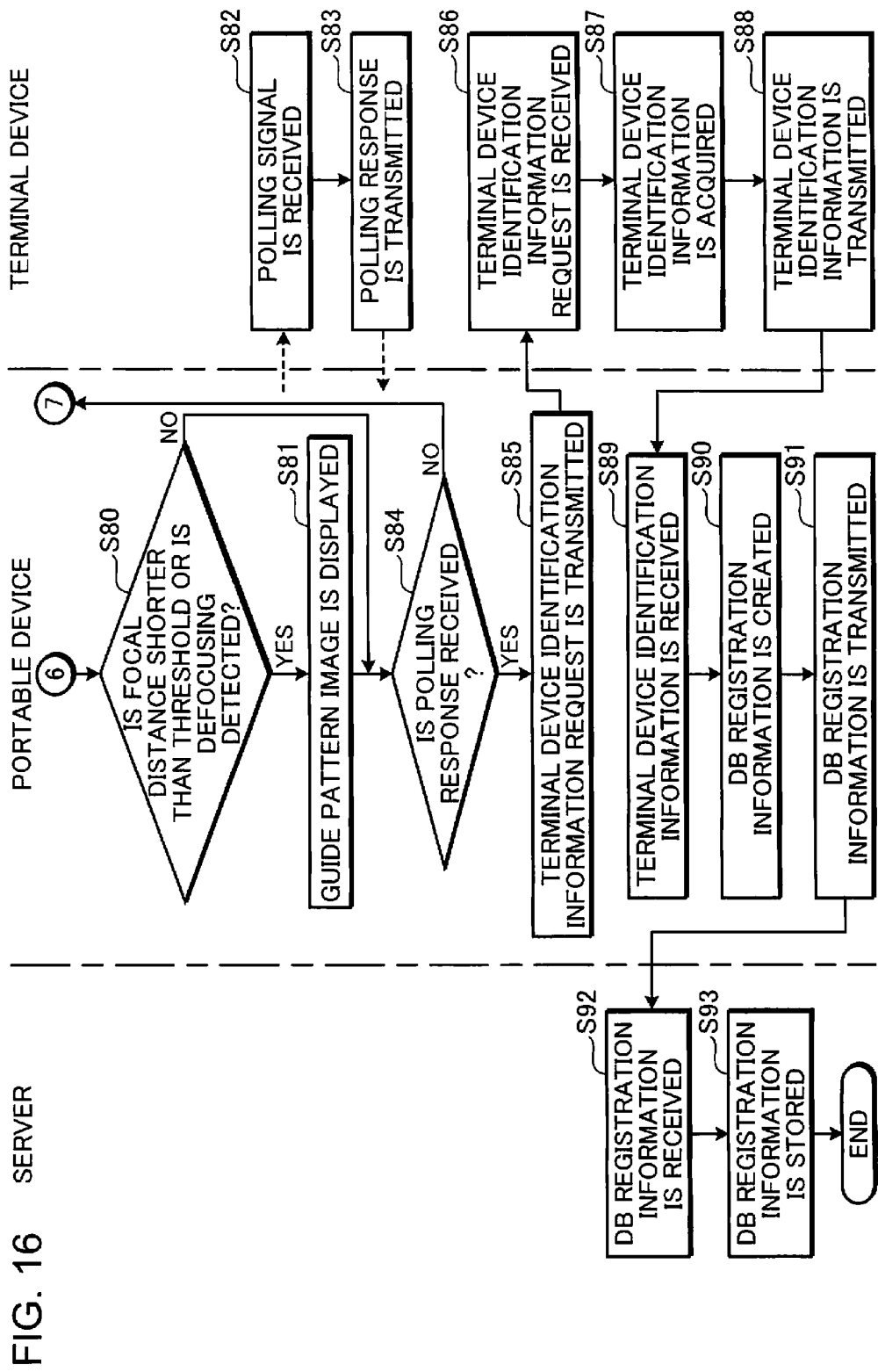
FIG. 16 is a third flowchart for illustrating the operation of the communication system in Embodiment 3 of the present invention.

The operation of the communication system of Embodiment 3 of the present invention is explained below. FIGS. 14, 15, and 16 are flowcharts for explaining the operation of the communication system in Embodiment 3 of the present invention.

The processing of steps S61 to S68 is similar to that of steps S1 to S8 shown in FIG. 4 and the explanation thereof is herein omitted.

In step S69, the system control unit 13 determines whether or not the camera position information has been stored in the camera position information storing unit 144. In this case, where it is determined that the camera position information has been stored (YES in step S69), the processing advances to step S76.

Meanwhile, where it is determined that the camera position information has not been stored (NO in step S69), in step S70, the mobile network communication unit 19 transmits a camera position information request for requesting the camera position information to the server 3, this request including the portable device identification information that has been read out from the portable device identification information storing unit 141.

Then, in step S71, the communication unit of the server 3 receives the camera position information request transmitted by the portable device 1.

Then, in step S72, the control unit of the server 3 acquires the camera position information corresponding to the portable device identification information included in the camera position information request from the camera position information management database. The camera position information corresponding to the portable device identification information is stored in the camera position information management database provided in the server 3. The camera position information management database stores the camera position information for each type of portable device.

Then, in step S73, the communication unit of the server 3 transmits the camera position information acquired from the camera position information management database to the portable device 1.

Then, in step S74, the mobile network communication unit 19 of the portable device 1 receives the camera position information transmitted by the server 3.

Then, in step S75, the mobile network communication unit 19 stores the received camera position information in the camera position information storing unit 144. The camera position information storing unit 144 stores the camera position information received by the mobile network communication unit 19. The camera position information can be also stored in the camera position information storing unit 144 in advance, when the portable device 1 is produced.

Then, in step S76, the system control unit 13 activates the image acquisition unit 21, and the image acquisition unit 21 starts acquiring (picking up) the images. The image acquisition unit 21 outputs the acquired images to the pattern identification unit 22.

Then, in step S77, the near-field communication unit 15 transmits a polling signal to the terminal device 2 via the loop antenna 11. In this case, since the portable device 1 has not been brought close to the terminal device 2, a polling response is not immediately returned. The near-field communication unit 15 continuously transmits the polling signal till the polling response is received.

Then, in step S78, the guide display control unit 17 controls the display unit 12 so that the guide line 121 representing the position of the loop antenna 11 is displayed in superposition on the image acquired by the image acquisition unit 21, on the basis of the antenna position information stored in the antenna position information storing unit 142 and the camera position information stored in the camera position information storing unit 144.

The system of coordinates of the coordinate position that represents the camera position information is identical to the system of coordinates of the coordinate position representing the antenna position information. Therefore, the mutual arrangement of the loop antenna 11 and the image acquisition unit 21 on the portable device 1 can be specified and the distance between the loop antenna 11 and the image acquisition unit 21 can be specified. The guide display control unit 17 converts the distance between the loop antenna 11 and the image acquisition unit 21 on the portable device 1 into the distance on the display screen of the display unit 12 and controls the display unit 12 so that the guide line 121 representing the position of the loop antenna 11 is displayed in superposition on the image acquired by the image acquisition unit 21.

The display unit 12 displays the guide line 121 on the display screen in superposition on the image acquired by the image acquisition unit 21 on the basis of the control performed by the guide display control unit 17. The guide line 121 is represented, for example, by two straight lines. The two straight lines are orthogonal to each other. The crossing point of the two straight lines represents the position of the loop antenna 11.

Then, in step S79, the guide display control unit 17 changes the display position of the guide line 121 representing the position of the loop antenna 11 according to the focal length to the guide pattern formed on the surface of the terminal device 2. The guide display control unit 17 changes the display position of the guide line 121 representing the position of the loop antenna 11 according to the size of the guide pattern which is formed on the surface of the terminal device 2 and the image of which has been captured.

The focal length decreases and the picked-up image of the guide pattern increases in size as the portable device 1 approaches the terminal device 2. Accordingly, the guide display control unit 17 calculates the focal length to the guide pattern formed on the surface of the terminal device 2 and changes the display position of the guide line 121 representing the position of the loop antenna 11 according to the calculated focal length. Further, the pattern identification unit 22 identifies a pattern matching the guide pattern stored in the guide pattern information storing unit 143 from among the images acquired by the image acquisition unit 21. The guide display control unit 17 then changes the display position of the guide line 121 on the basis of the size of the guide pattern identified by the pattern identification unit 22.

Then, in step S80, the guide display control unit 17 determines whether or not the focal length is shorter than a threshold or whether or not defocusing has been detected. When it is determined that the focal length is not shorter than the threshold or that no defocusing has been detected (NO in step S80), the processing advances to step S84. The defocusing is detected on the basis of sharpness of the signal at the boundary portion (contour portion) of the image acquisition unit 21.

Meanwhile, when it is determined that the focal length is shorter than the threshold or that defocusing has been detected (YES in step S80), in step S81, the guide display control unit 17 reads the guide pattern image stored in the guide pattern information storing unit 143 and displays the read-out guide pattern image on the display unit 12.

As the portable device 1 approaches the terminal device 2, the picked-up image becomes defocused and a blurred image is displayed. Where the portable device 1 comes into contact with the terminal device 2, the image acquired by the image acquisition unit 21 gets dark and the guide pattern cannot be displayed. Accordingly, when the portable device 1 gets close to the terminal device 2 to a distance at which defocusing starts, the guide display control unit 17 switches the image to be displayed on the display unit 12 from the image acquired by the image acquisition unit 21 to the guide pattern image stored in the guide pattern information storing unit 143. As a result, the non-display of the guide pattern on the display unit 12 is prevented.

Then, in step S84, the near-field communication unit 15 determines whether the polling response has been received by the terminal device 2 via the loop antenna 11. The polling signal is continuously transmitted. Therefore, the near-field communication unit 203 of the terminal device 2 receives the polling signal from the portable device 1 via the loop antenna 204 (step S82) and transmits a polling response to the portable device 1 via the loop antenna 204 (step S83). In this case, where it is determined that the polling response has not been received from the terminal device 2 (NO in step S84), the processing returns to step S78.

Meanwhile, when it is determined that the polling response has been received from the terminal device 2 (YES in step S84), the near-field communication unit 15 transmits a terminal device identification information request for requesting the terminal device identification information for identifying the terminal device 2 to the terminal device 2 via the loop antenna 11.

The processing of steps S86 to S93 is identical to that of steps S16 to S23 shown in FIG. 5 and therefore the explanation thereof is herein omitted.

The guide image (guide line 121) representing the position of the loop antenna 11 is thus displayed in superposition on the image acquired by the image acquisition unit 21. Therefore, even when the portable device 1 is brought close to the terminal device 2, the user can align the antenna of the portable device 1 with the antenna of the terminal device 2, while observing the image acquired by the image acquisition unit 21.

Further, since the guide image (guide line 121) is displayed according to the antenna position information and camera position information in superposition on the image acquired by the image acquisition unit, the guide image can be accurately displayed in superposition on the image acquired by the image acquisition unit 21 even when the loop antenna 11 and the image acquisition unit 21 are disposed at different positions in the portable device 1.

Further, since the guide image (guide line 121) is displayed according to the distance between the portable device 1 and the terminal device 2, the display position of the guide image can be changed as the distance between the portable device 1 and the terminal device 2 is reduced.

Furthermore, since the guide image (guide line 121) is displayed according to the size of the guide pattern included in the image acquired by the image acquisition unit 21, the display position of the guide image can be changed as the guide pattern included in the image acquired by the image acquisition unit 21 increases in size.

Figure 17A:
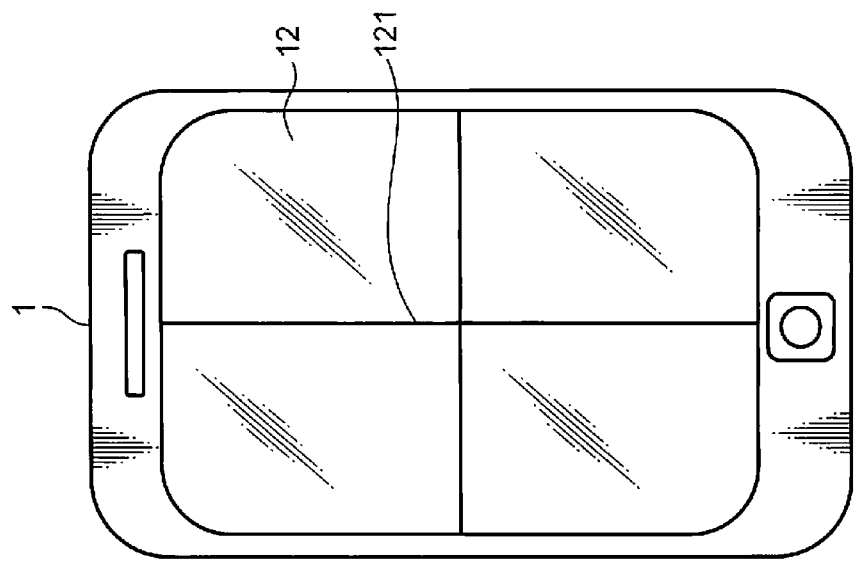
FIG. 17A illustrates the rear surface side, as viewed through a transparent front surface side, of the portable device in a variation example of Embodiment 3 of the present invention.
Figure 17B:
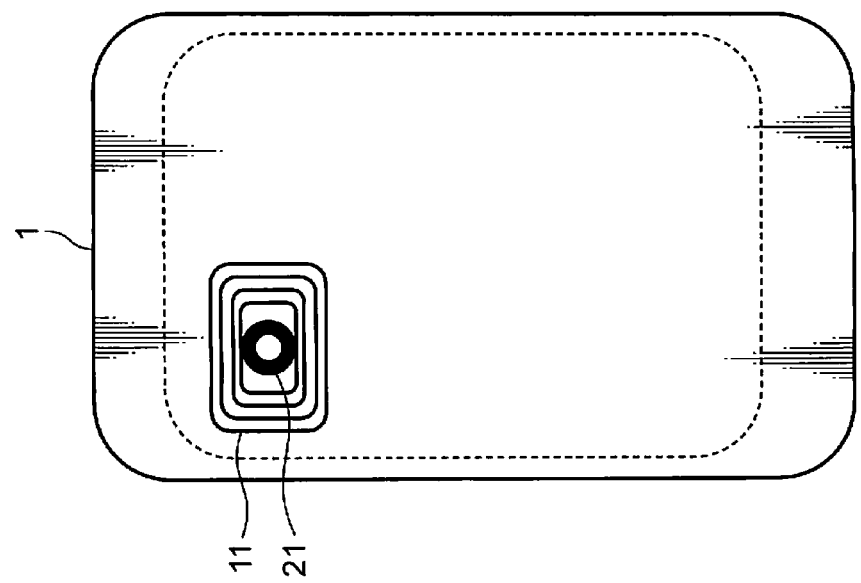
FIG. 17B illustrates the front surface of the portable device in the variation example of Embodiment 3 of the present invention.

A variation example of Embodiment 3 of the present invention is explained below. FIGS. 17 illustrate the external configurations of the portable device in the variation example of Embodiment 3 of the present invention. FIG. 17A illustrates the rear surface side, as viewed through a transparent front surface side, of the portable device in the variation example of Embodiment 3 of the present invention. FIG. 17B illustrates the front surface of the portable device in the variation example of Embodiment 3 of the present invention.

In the portable device of the abovementioned Embodiment 3, the loop antenna 11 and the image acquisition unit 21 are disposed at different positions. By contrast, in the portable device of the variation example of Embodiment 3, the image acquisition unit 21 is disposed in the zone surrounded by the loop antenna 11.

As shown in FIG. 17A, the image acquisition unit 21 is disposed in the zone surrounded by the loop antenna 11, and it is preferred that the image acquisition unit 21 be disposed in a central portion of the zone surrounded by the loop antenna 11. In this case, as shown in FIG. 17B, the crossing point of the guide lines 121 representing the position of the loop antenna 11 is displayed in the central portion of the display screen.

As a result, since the central portion of the picked-up image displayed on the display unit 12 corresponds to the position of the loop antenna 11, the position of the loop antenna 11 can be displayed close to the center of the display screen, without correcting the picked-up image.

Furthermore, it is preferred that the positional relationship between the image acquisition unit 21 and the loop antenna 11 be within a range in which the loop antenna mounting portion (guide pattern) of the terminal device 2 be viewed in the image picked up by the image acquisition unit 21 at the maximum distance at which near-field communication between the terminal device 2 and the portable device 1 is possible.

For example, where the maximum distance at which near-field communication is possible is 1 cm, it is preferred that the distance between the image acquisition unit 21 and the loop antenna 11 be shorter than the distance from the point viewed in the center of the picked-up image and the point viewed at the edge thereof when the image acquisition unit 21 of the portable device 1 picks up the image of a plane perpendicular to the image pick-up direction from a position at a distance of 1 cm. In this case, the position of the loop antenna on the terminal device 2 side can be displayed on the display unit 12 till the portable device 1 and the terminal device 2 are connected by near-field communication. As a result, the guide display can be performed such that near-field communication between the portable device 1 and the terminal device 2 can be easily established.

Further, when the image acquisition unit 21 of the portable device 1 is provided in advance with a wide-angle lens, the loop antenna position of the terminal device 2 can be easily picked up by switching to the wide-angle lens according to the focus position.

Further, in step S80 shown in FIG. 16, the same effect can be also obtained where the guide display control unit 17 verifies the size of the guide pattern obtained by picking up the image of the terminal device 2 by image verification or the like, instead of determining whether or not the focal length is less than a threshold or whether defocusing has been detected. A guide pattern is formed on the loop antenna mounting portion on the terminal device 2 side to clarify the approach position of the portable device 1. Therefore, the guide display control unit 17 can use the size of the guide pattern acquired by the image acquisition unit 21 as information indicating the distance between the portable device 1 and the terminal device 2 and use it as information similar to the focal length. Where the distance between the portable device 1 and the terminal device 2 decreases too much, the guide pattern acquired by the image acquisition unit 21 is displayed on the entire display unit 12 and defocusing can occur. In the present embodiment, even in this case, the guide display control unit 17 can display the guide pattern so that near-field communication can be easily established between the portable device 1 and the terminal device 2.

Further, in the present embodiment, the guide display control unit 17 changes the guide position displayed on the display unit 12 according to the focus position. When the attachment position of the image acquisition unit 21 of the portable device 1 is at a distance from the attachment position of the loop antenna 11, the scale of the image displayed on the display unit 12 differs depending on the focus position. Therefore, the guide display control unit 17 corrects the position at which the guide is displayed by determining the image scale on the basis of the focus position. More specifically, when the distance between the image acquisition unit 21 and the terminal device 2 is large, the image can be picked up in a wide range (for example, 10 cm), but when the distance between the image acquisition unit 21 and the terminal device 2 is small, the image can be picked up only in a narrow range (for example, 2 cm). Meanwhile, the distance between the image acquisition unit 21 and the loop antenna 11 of the portable device 1 is determined according to the portable device 1 (for example, 1 cm). The guide display control unit 17 determines the scale of the image displayed by the display unit 12 according to the focus position and changes the guide position displayed as the loop antenna position. As a result, the user can perform guide display so that near-field communication between the portable device 1 and the terminal device 2 could be easily established according to the guide display.

In Embodiments 1 to 3, the position of the loop antenna 11 is represented by the crossing point of the guide lines 121, but the present invention is not particularly limited to such a configuration. The position of the loop antenna 11 may be displayed in another display mode. For example, a mark representing the position of the loop antenna 11 may be displayed.

Further, in Embodiments 1 to 3, the computer may function as the system control unit 13, the guide display control unit 17, the portable device identification information storing unit 141, the antenna position information storing unit 142, the guide pattern information storing unit 143, and the camera position information storing unit 144 by executing a communication program for communicating with an external device by using near-field communication.

The above-described specific embodiments mainly include the invention having the following features.

The communication apparatus according to one aspect of the present invention is a communication apparatus that communicates with an external device by using near-field communication, including: a loop antenna for performing near-field communication; a display unit provided on a side of the communication apparatus opposite an orientation of the loop antenna; and a position information storing unit that stores antenna position information representing a position of the loop antenna in the communication apparatus, wherein the display device displays the position of the loop antenna on the basis of the antenna position information stored in the position information storing unit.

In such a configuration, the display unit is provided on the side opposite that of the orientation of the loop antenna for performing near-field communication, and the position information storing unit stores antenna position information representing the position of the loop antenna in the communication apparatus. Further, the display device displays the position of the loop antenna on the basis of the antenna position information stored in the position information storing unit.

Therefore, since the position of the loop antenna is displayed on the basis of the antenna position information stored in the position information storing unit, the position of the antenna incorporated in the communication apparatus can be indicated to the user and the antenna of the communication apparatus can be easily aligned with the antenna of the external device.

It is preferred that the abovementioned communication apparatus further include a communication apparatus identification information storing unit that stores communication apparatus identification information for identifying the communication apparatus, and a position information acquisition unit that transmits the communication apparatus identification information stored in the communication apparatus identification information storing unit to a server connected via a network, and acquires the antenna position information corresponding to the communication apparatus identification information from the server, wherein the position information storing unit stores the antenna position information acquired by the position information acquisition unit.

In such a configuration, the communication apparatus identification information storing unit stores communication apparatus identification information for identifying the communication apparatus, and the position information acquisition unit transmits the communication apparatus identification information stored in the communication apparatus identification information storing unit to a server connected via a network and acquires the antenna position information corresponding to the communication apparatus identification information from the server. Further, the position information storing unit stores the antenna position information acquired by the position information acquisition unit.

Therefore, since the antenna position information corresponding to the communication apparatus identification information is acquired, even in the case of the communication apparatus for which the antenna position information has not been stored at the time of shipping, the antenna position information can be thereafter acquired. Further, the position of the loop antenna differs for each type of communication apparatus, but the antenna position information corresponding to the communication apparatus can be acquired.

It is also preferred that the abovementioned communication apparatus further include an image acquisition unit that acquires an image of the orientation of the loop antenna, wherein the display unit displays a guide image representing the position of the loop antenna in superposition on the image acquired by the image acquisition unit.

With such a configuration, the image acquisition unit acquires the image of the orientation of the loop antenna, and the display unit displays the guide image representing the position of the loop antenna in superposition on the image acquired by the image acquisition unit. Therefore, the guide image representing the position of the loop antenna is displayed in superposition on the image acquired by the image acquisition unit. As a result, even when the communication apparatus is brought close to the external device, the user can align the antenna of the communication apparatus with the antenna of the external device, while observing the image acquired by the image acquisition unit.

It is also preferred that in the abovementioned communication apparatus, the image acquisition unit be disposed within a zone surrounded by the loop antenna. With such a configuration, the central position of the image acquired by the image acquisition unit corresponds to the position of the loop antenna. Therefore, the position of the loop antenna can be displayed close to the center of the display screen, without correcting the image acquired by the image acquisition unit.

It is also preferred that in the abovementioned communication apparatus, the position information acquisition unit acquire the antenna position information and also acquire image acquisition position information representing a position of the image acquisition unit in the communication apparatus, and the display unit display the guide image in superposition on the image acquired by the image acquisition unit according to the antenna position information and the image acquisition position information.

With such a configuration, the position information acquisition unit acquires the antenna position information and also acquires image acquisition position information representing a position of the image acquisition unit in the communication apparatus. Further, the display unit displays the guide image in superposition on the image acquired by the image acquisition unit according to the antenna position information and the image acquisition position information.

Therefore, since the guide image is displayed in superposition on the image acquired by the image acquisition unit according to the antenna position information and the image acquisition position information, the guide image can be accurately displayed in superposition on the image acquired by the image acquisition unit even when the loop antenna and the image acquisition unit are disposed at different positions inside the communication apparatus.

It is also preferred that in the abovementioned communication apparatus, the display unit display the guide image according to a distance between the communication apparatus and the external device.

With such a configuration, the guide image is displayed according to the distance between the communication apparatus and the external device. Therefore, the display position of the guide image can be changed as the distance between the communication apparatus and the external device is reduced.

It is also preferred that in the abovementioned communication apparatus, the external device have a guide pattern representing a position of an antenna performing near-field communication, and the display unit display the guide image according to a size of the guide pattern included in the image acquired by the image acquisition unit.

With such a configuration, the external device has the guide pattern representing the position of the antenna performing near-field communication. Further, the display unit displays the guide image according to the size of the guide pattern included in the image acquired by the image acquisition unit.

Therefore, since the guide image is displayed according to the size of the guide pattern included in the image acquired by the image acquisition unit, the display position of the guide image can be changed as the guide pattern included in the image acquired by the image acquisition unit increases in size.

It is also preferred that in the abovementioned communication apparatus, the external device have a guide pattern representing a position of an antenna performing near-field communication, and the communication apparatus further include: a selection acceptance unit that accepts selection of the external device; and a guide pattern acquisition unit that transmits external device identification information for identifying the external device selected by the selection acceptance unit to the server, and acquires the guide pattern corresponding to the external device identification information, wherein the display unit displays the guide pattern acquired by the guide pattern acquisition unit as the position of the loop antenna.

In such a configuration, the external device has a guide pattern representing the position of the antenna performing near-field communication. The selection acceptance unit accepts selection of the external device. The guide pattern acquisition unit transmits external device identification information for identifying the external device selected by the selection acceptance unit to the server, and acquires the guide pattern corresponding to the external device identification information. Further, the display unit displays the guide pattern acquired by the guide pattern acquisition unit as the position of the loop antenna.

Therefore, since the guide pattern acquired by the guide pattern acquisition unit is displayed as the position of the loop antenna, the user can search for the guide pattern of the external device by checking the guide pattern displayed on the display device of the communication apparatus and can easily align the antenna of the communication apparatus with the antenna of the external device.

The communication method according to another aspect of the present invention is a communication method for communicating with an external device by using near-field communication, including: a position information storing step of storing, in a position information storing unit, antenna position information representing a position of a loop antenna for performing near-field communication in a communication apparatus; and a display step of displaying the position of the loop antenna on the basis of the antenna position information stored in the position information storing unit, on a display unit provided on a side of the communication apparatus opposite an orientation of the loop antenna.

With such a configuration, in the position information storing step, antenna position information representing the position of the loop antenna for near-field communication in the communication apparatus is stored in the position information storing unit. In the display step, the position of the loop antenna is displayed on the basis of the antenna position information stored in the position information storing unit on the display unit provided on the side opposite that of the orientation of the loop antenna.

Therefore, since the position of the loop antenna is displayed on the basis of the antenna position information stored in the position information storing unit, the position of the antenna incorporated in the communication apparatus can be indicated to the user and the antenna of the communication apparatus can be easily aligned with the antenna of the external device.

Specific embodiments or examples described in the Description of Embodiments merely clarify the technical contents of the present invention, and the present invention should not be interpreted narrowly as being limited only to those specific examples. Thus, various changes can be implemented without departing from the essence of the present invention and within the scope of the claims.

INDUSTRIAL APPLICABILITY

The communication apparatus and communication method in accordance with the present invention can indicate the position of the antenna incorporated in the communication apparatus to the user and align the antenna of the communication apparatus with the antenna of the external device, and are therefore useful as a communication apparatus and a communication method for communication with external devices by using near-field communication.

The invention claimed is:

1. A communication apparatus that communicates with a server connected via a network and also communicates, by using near-field communication, with a plurality of external devices, each of the external devices being provided with a Radio Frequency Identification (RFID) tag, the communication apparatus comprising:

a selection acceptance unit that accepts a selection by a user of a target external device performing the near-field communication among the plurality of external devices, the target external device having a surface on which a guide pattern representing a position of an antenna performing the near-field communication is formed;

a guide pattern acquisition unit that transmits external device identification information for identifying the target external device selected by the user to the server, and acquires, from the server, a guide pattern image having the same shape as the guide pattern corresponding to the external device identification information;

a loop antenna that outputs a polling signal by near-field communication to the RFID tag provided in the target external device and receives a polling response by near-field communication from the RFID tag provided in the target external device that has received the polling signal;

a display unit provided on a side of the communication apparatus opposite an orientation in which the loop antenna transmits the polling signal and receives the polling response;

a communication apparatus identification information storing unit that stores communication apparatus identification information for identifying the communication apparatus;

a position information acquisition unit that transmits the communication apparatus identification information stored in the communication apparatus identification information storing unit to the server and acquires, from the server, antenna position information that represents a position of the loop antenna in the communication apparatus and that corresponds to the communication apparatus identification information; and a position information storing unit that stores the acquired antenna position information, wherein the display unit displays the guide pattern image acquired by the guide pattern acquisition unit as a guide pattern indicating the position of the loop antenna on the basis of the antenna position information which is stored in the position information storing unit, and fixedly displays the guide pattern image at the position of the loop antenna included in the communication apparatus regardless of a movement of the communication apparatus, within a period in which the loop antenna outputs the polling signal to the target external device.

2. The communication apparatus according to claim 1, further comprising:

an image acquisition unit that acquires an image of the orientation of the loop antenna, wherein the display unit displays a guide image representing the position of the loop antenna in superposition on the image acquired by the image acquisition unit.

3. The communication apparatus according to claim 2, wherein the image acquisition unit is disposed within a zone surrounded by the loop antenna.

4. The communication apparatus according to claim 2, wherein the position information acquisition unit acquires the antenna position information and also acquires image acquisition position information representing a position of the image acquisition unit in the communication apparatus, and the display unit displays the guide image in superposition on the image acquired by the image acquisition unit according to the antenna position information and the image acquisition position information.

5. The communication apparatus according to claim 2, wherein the display unit displays the guide image according to a distance between the communication apparatus and the target external device.

6. The communication apparatus according to claim 2, wherein the display unit displays the guide image according to a size of the guide pattern included in the image acquired by the image acquisition unit.

7. A communication method in a communication apparatus that communicates with a server connected via a network and also communicates, by using near-field communication, with a plurality of external devices, each of the external devices being provided with a Radio Frequency Identification (RFID) tag, the communication method comprising the steps of:

accepting a selection by a user of a target external device performing the near-field communication among the plurality of external devices, the target external device having a surface on which a guide pattern representing a position of an antenna performing the near-field communication is formed;

transmitting external device identification information for identifying the target external device selected by the user to the server, and acquiring, from the server, a guide pattern image having the same shape as the guide pattern corresponding to the external device identification information;

outputting a polling signal to the RFID tag provided in the target external device from a loop antenna that is provided in the communication apparatus and performs near-field communication;

receiving with the loop antenna a polling response transmitted from the RFID provided in the target external device that has received the polling signal;

transmitting communication apparatus identification information for identifying the communication apparatus to the server;

acquiring, from the server, antenna position information that represents a position of the loop antenna in the communication apparatus and that corresponds to the communication apparatus identification information; and displaying the acquired guide pattern image as a guide pattern indicating the position of the loop antenna on the basis of the antenna position information, and fixedly displaying the guide pattern image at the position of the loop antenna included in the communication apparatus regardless of a movement of the communication apparatus, within a period in which the loop antenna outputs the polling signal to the external device, on a display unit provided on a side of the communication apparatus opposite an orientation in which the loop antenna transmits the polling signal and receives the polling response.

* * * * *